United States Patent

Nemirovskiy

[19]

[11] Patent Number: 5,946,077
[45] Date of Patent: Aug. 31, 1999

[54] METHOD AND APPARATUS FOR IMPROVED THREE DIMENSIONAL PHOTOGRAPHY

[75] Inventor: Yevgeniy Nemirovskiy, Charlotte, N.C.

[73] Assignee: Herman D. Mims, Shelby, N.C.

[21] Appl. No.: 09/072,081

[22] Filed: May 4, 1998

Related U.S. Application Data

[63] Continuation-in-part of application No. 08/301,350, Sep. 6, 1994, abandoned, which is a continuation-in-part of application No. 08/001,340, Jan. 7, 1993, abandoned, and a continuation-in-part of application No. PCT/US96/09891, Jun. 3, 1996, abandoned.

[51] Int. Cl.$^6$ .......................... G03B 35/24; G02B 27/22
[52] U.S. Cl. ................... 355/22; 355/77; 396/324
[58] Field of Search .................... 396/322, 324, 396/325, 326, 327, 330, 333; 355/22, 33, 77; 352/58, 60; 353/7; 359/463

[56] References Cited

U.S. PATENT DOCUMENTS

| | | | |
|---|---|---|---|
| 3,482,913 | 12/1969 | Glenn, Jr. | 355/33 |
| 3,494,270 | 2/1970 | Shibata | 354/112 |
| 3,518,929 | 7/1970 | Glenn, Jr. | 354/113 |
| 3,535,993 | 10/1970 | Jones | 354/112 |
| 3,769,889 | 11/1973 | Wechsler | 354/115 |
| 3,852,787 | 12/1974 | Nims et al. | 354/275 |
| 3,895,867 | 7/1975 | Lo et al. | 355/77 |
| 3,953,869 | 4/1976 | Wah Lo et al. | 354/115 |
| 4,037,950 | 7/1977 | Wah Lo et al. | 352/58 |
| 4,086,585 | 4/1978 | Wah Lo et al. | 354/115 |
| 4,101,210 | 7/1978 | Lo et al. | 353/7 |
| 4,107,712 | 8/1978 | Law | 354/115 |
| 4,132,468 | 1/1979 | Lo et al. | 353/7 |
| 4,158,501 | 6/1979 | Smith et al. | 355/77 |
| 4,475,798 | 10/1984 | Smith et al. | 354/114 |
| 4,478,639 | 10/1984 | Smith et al. | 430/9 |
| 4,552,442 | 11/1985 | Street | 354/112 |
| 4,630,913 | 12/1986 | Lo | 354/115 |
| 4,674,853 | 6/1987 | Street | 354/112 |
| 4,800,407 | 1/1989 | Wah Lo | 354/114 |
| 4,852,972 | 8/1989 | Wah Lo | 359/463 |
| 4,903,069 | 2/1990 | Lam | 355/22 |
| 5,022,727 | 6/1991 | Smith et al. | 359/23 |
| 5,302,989 | 4/1994 | Taguchi et al. | 354/112 |
| 5,548,362 | 8/1996 | Wah Lo | 354/114 |

FOREIGN PATENT DOCUMENTS

| | | | |
|---|---|---|---|
| 0654701 A1 | 5/1995 | European Pat. Off. | G03B 35/24 |
| WO 92/22989 | 12/1992 | WIPO | G03B 35/08 |

OTHER PUBLICATIONS

Okoshi, Takanori; "Three–Dimensional Imaging Techniques"; 1976.
Nemirovskiy, Yevgeniy; Letter To Christopher C. Dremann Dated Apr. 21, 1998, Re: Invention Disclosing Activity.

*Primary Examiner*—Howard B. Blankenship
*Attorney, Agent, or Firm*—Christopher C. Dremann, PC; Christopher C. Dremann

[57] ABSTRACT

An improved method and apparatus for the production of superior quality three dimensional images utilizing a multi-lens camera and a multi-lens enlarger configured according to a standard of arrangements. The number of lenses used in the camera and the enlarger is selected to he greater than the resolution capabilities of the human eye and the lenticular print system. The width of a zone of the lineiform image is determined by the distance between two adjacent images on the focal plane of the lenticular screen of a point projected from a distance at or beyond the distance limit through adjacent projecting apertures of the enlarger. The projecting apertures of the enlarger are linearly arrayed and equally spaced within the accepting angle corresponding to the distance limit to construct a lineiform image without gaps between zones and without gaps between lines. Accordingly, a three dimensional image having orthoscopic effect, without stroboscopic effect, is produced in a one-step imaging and one-step composing process.

32 Claims, 19 Drawing Sheets

(PRIOR ART)

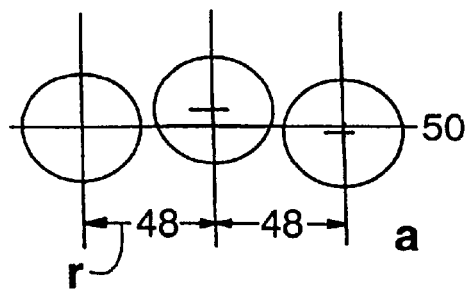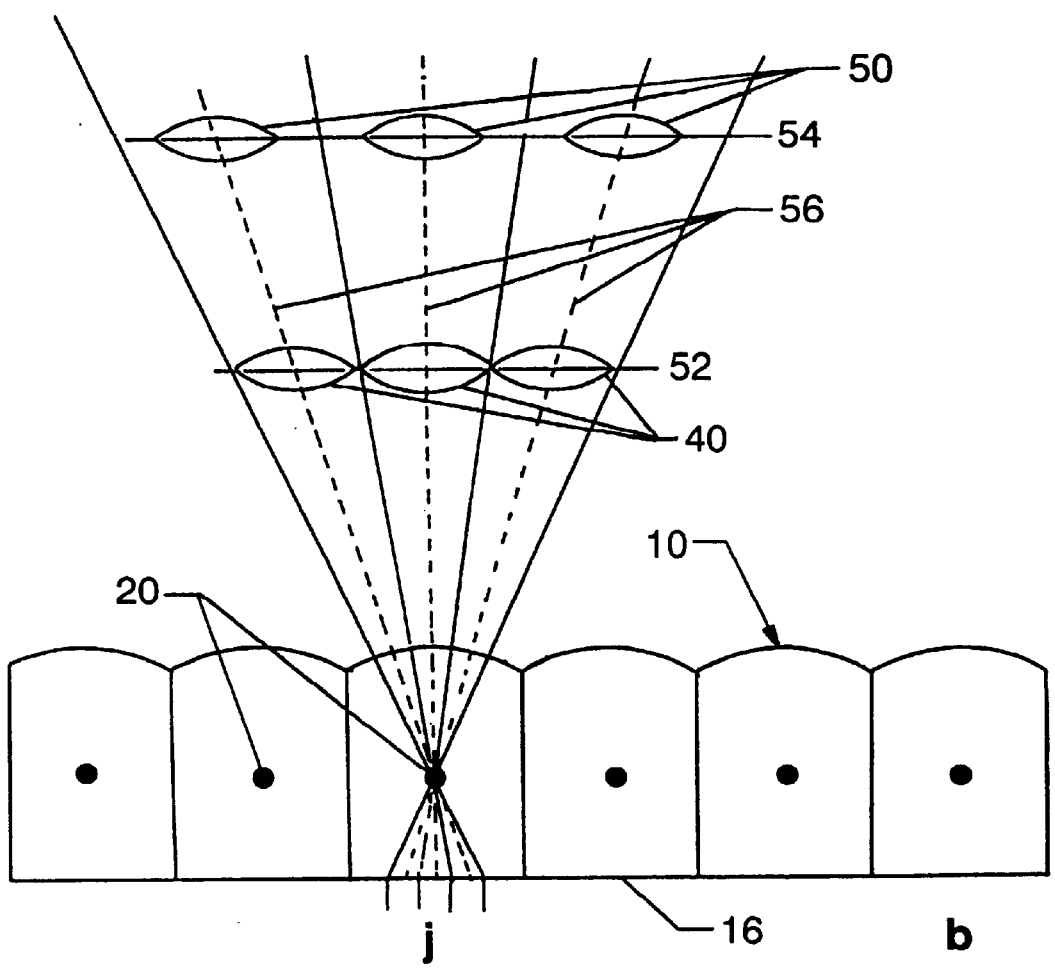
Fig.19

METHOD AND APPARATUS FOR IMPROVED THREE DIMENSIONAL PHOTOGRAPHY

CROSS REFERENCE TO RELATED APPLICATIONS

This application is a continuation-in-part of U.S. patent application Ser. No. 08/301,350, filed Sep. 6, 1994, which application is a continuation-in-part of U.S. patent application Ser. No. 08/001,340, filed Jan. 7, 1993, and a continuation-in-part of International Application Ser. No. PCT/US96/09891, filed Jun. 3, 1996, all now abandoned.

FIELD OF THE INVENTION

The present invention relates to a method and apparatus for the production of improved three dimensional images, and more particularly, to a method and apparatus for the indirect production of a three dimensional image from a plurality of two dimensional images of at least one element in objective space created by a multi-lens camera and projected onto a lenticular screen by a multi-lens enlarger.

BACKGROUND OF THE INVENTION

Pioneers in photography have always strived to create more life-like photographs. One of the difficulties of photography has been to record a three dimensional object on a two dimensional medium. In 1844, a technique for taking three dimensional, or stereoscopic, photographs was demonstrated in Germany. Two discrete images were used to create a three dimensional effect when viewed through a special device. Later, this viewing device was replaced by special glasses having different color lenses to allow the user to view black and white three dimensional pictures and movies. Special glasses having polarized lenses were later used for viewing color pictures.

The next major advance in the art was the development of a system which creates the perception of three dimensions without the need for special glasses. This revolutionary system utilizes a lenticular screen placed over a special image that presents each eye with a discrete two dimensional image. The brain combines the discrete two dimensional images to create the perception of three dimensions. To one skilled in the art, the term "lenticular print system" describes an enlarger comprising a lenticular screen having a photosensitive material either bonded to the focal plane or in contact with the focal plane. The image formed under the lenticular screen is known as a parallax-panoramogram, or as used herein, a lineiform image.

A lineiform image is comprised of zones of lines. In a conventional lenticular print system, a line of the lineiform image is a narrow image produced by a lenticular which corresponds to a discrete two dimensional image projected by an enlarger. A zone is that portion of the lineiform image which is produced by one lenticula. Thus, a zone is comprised of as many lines as the number of discrete two dimensional images projected by the enlarger. Typically, the number of discrete two dimensional images projected by the enlarger, and thus the number of lines in each zone of the lineiform image, is the same as the number of projecting apertures of the enlarger. In a conventional enlarger, there is a single projecting aperture for each lens of the enlarger, and a single discrete two dimensional image is projected by each projecting aperture.

Presently, two methods of creating suitable lineiform images are employed: direct, and indirect. In the direct method, the lineiform image is created inside a special camera equipped with a lenticular screen and is then printed using an enlarger having a single optical lens. The lineiform image thus produced is then viewed through a lenticular screen. The main problems associated with the direct method are the long photographing exposure time required and the necessity to move the camera during a single exposure.

Conversely, the indirect method utilizes a plurality of discrete two dimensional images taken from different vantage points by a camera having a corresponding plurality of optical lenses positioned on a plank and arranged in a row. This row of images is then projected through a multi-lens enlarger onto a lenticular screen to produce the lineiform image. Alignment of the lineiform image with the lenticular screen is generally not a problem. The present invention is an improvement of the prior methods and apparatus for the production of three dimensional lenticular photographs by the indirect method.

Who Before the present invention, the production of three dimensional images by the indirect method faced several problems. First, achieving an acceptable orthoscopic effect (i.e., where the scale of all three dimensions are correctly proportioned) has been difficult. Second, as composing has previously been performed in several steps, the length of time required for composing is substantial. Third, amalgamation of the discrete two dimensional images to construct the lineiform image has required excessive time and labor due to the high level of precision required. Even where amalgamation is achieved, gaps between the zones of the lineiform image or gaps between the individual lines of the lineiform image, or both, were unavoidable. Fourth, three dimensional photographs produced according to past teachings have a limited viewing window in which the optimal three dimensional effect is perceived. Finally, prior three dimensional photographs suffer from a stroboscopic effect whereby the viewer perceives two separate images simultaneously, or perceives a distinct switch from an image produced by one lens to an image produced by another lens as the viewer moves his head.

The prior advancements relating to three dimensional imaging using a lenticular screen are based on the theoretical supposition that superior quality can be achieved by forcing each zone of the lineiform image to occupy the exact width of the space under a lenticula. In practice, this requires that the aperture angle of each lenticula be effectively filled with the projecting apertures of the enlarger. The aperture angle is that angle which is formed by passing rays originating from the point at which perpendicular projections of the edges of the lenticula meet the focal plane through the optical center of the lenticula. FIG. 4 of U.S. Pat. No. 3,953,869 to Wah Lo, for example, shows four discrete two dimensional images projected onto the lenticular screen and producing four discrete, non-overlapping lines of the lineiform image under a lenticula. Similarly, FIG. 9 of U.S. Pat. No. 3,895,867 to Lo shows six discrete, non-overlapping lines produced on the lineiform image. In order for each zone of the lineiform image to occupy the exact width of the space under a lenticula, each line of the lineiform image can be no wider than w/n; where w is the width of each lenticula, and n is the number of discrete images projected onto the lenticular screen. Most methods for achieving this goal require printing the lineiform image in several exposures while adjusting the position of the lenticular screen relative to the enlarger between each exposure to ensure that the lines are congruent.

The objective of the prior indirect methods and apparatus has been to provide each of the viewer's eyes with a separate image so that the viewer's left eye sees one discrete image and the viewer's right eye sees another discrete image. If there are ten (10) discrete two dimensional images projected onto the lenticular screen by the enlarger, and thus ten (10) lines of the lineiform image projected onto the focal plane in each zone of the lineiform image, the viewer may see, for example, the 3rd image with the left eye and the 6th image with the right eye from one position. From a different position, the viewer might see, for example, the 4th image with the left eye and the 7th image with the right eye. In addition, the prior indirect methods avoid overlapping of the lines of the lineiform image.

The objective of the indirect method and apparatus of the invention, on the other hand, is to provide each of the viewer's eyes with at least two, and preferably more, overlapping discrete images. If there are forty (40) two dimensional images projected onto the lenticular screen by the enlarger, and thus forty (40) lines of the lineiform image projected onto the focal plane in each zone of the lineiform image, the viewer may see, for example, the overlapping 19th, 20th, 21st and 22nd images with the left eye and the overlapping 23rd, 24th, 25th and 26th images with the right eye from one position. From a different position, the viewer might see, for example, the overlapping 20th, 21st, 22nd and 23rd images with the left eye and the overlapping 24th, 25th, 26th and 27th images with the right eye. The multiple, overlapping two dimensional images viewed on the lineiform image are not perceived to be blurred by the viewer because the difference in parallax between the adjacent overlapping images presented to each eye is less than the resolution capability of the viewer. Furthermore, the overlapping two dimensional images are arranged and aligned on the lineiform image so that the perceived location of the elements in objective space reproduced on the lineiform image do not change location relative to the lenticular screen when the perspective of the viewer is changed.

The prior methods of viewing just two separate images create a sharp three dimensional image in only a limited viewing area. When the viewer's head moves to a position from which the viewer views the edges of two adjacent lines of the lineiform image, the viewer will see an image wherein each eye perceives two separate images simultaneously. This phenomenon is known as "stroboscopic effect." In other words, the viewer will see, for example, the 3rd and 4th images with the left eye, and the 6th and 7th images with the right eye because of the large parallax between adjacent two dimensional images. These two images are sufficiently different so that there is a perception of two superimposed discrete images. In the prior apparatus, the projecting apertures of the enlarger are positioned closer to the lenticular screen than the distance limit described herein, and are required to be positioned in edge-to-edge relationship, or are required to move relative to the lenticular screen to simulate edge-to-edge relationship. The total number of projecting apertures used by the prior apparatus, however, is insufficient to produce a small enough parallax between adjacent two dimensional images so that the discrete images are perceived to be a solid object.

In the method of the invention, viewing, for example, four images simultaneously with each eye eliminates stroboscopic effect. The greater number of discrete two dimensional images divides the largest single parallax into such small parts that the four discrete two dimensional images are perceived to be a solid object. The method of the invention further provides empirical techniques for: 1) determining the optimal number of two dimensional images to use; and 2) determining the minimum number of two dimensional images necessary to eliminate stroboscopic effect.

The prior indirect methods also presume that the projecting distance of the enlarger should be the same as the viewing distance of the three dimensional photograph. When viewing the three dimensional photograph from the projecting distance, the positions of the viewer's left and right eyes must exactly match the positions of two of the projecting apertures. This requirement limits the number of projecting apertures that can be used. When the viewing distance is changed, the left and right eyes of the viewer no longer match the positions of any two of the projecting apertures. Accordingly, from any distance except the projecting distance, the viewer will perceive stroboscopic effect in some area of the three dimensional photograph. Also, as the viewer moves away from the lenticular screen, the perceived image will deepen (i.e., the perceived image will not maintain orthoscopic accuracy in the depth dimension). Conversely, as the viewer moves towards the lenticular screen, the perceived image will flatten. In the method of the invention, matching the viewer's eyes with the positions of the projecting apertures is not required. The viewer may view the lenticular photograph at viewing distances different from the projecting distance. Thus, stroboscopic effect is eliminated in all areas of the three dimensional photograph.

The prior methods and apparatus are plagued by a further consequence resulting from positioning the projecting apertures closer to the lenticular screen than the "distance limit" defined hereinafter. Simply eliminating the gaps between lines of the lineiform image does not permit the prior methods and apparatus to accomplish both one-step imaging and one-step printing without moving at least one of the following components of the lenticular print system: 1) the film; 2) the lenticular screen; 3) the projecting apertures; or 4) the photosensitive material. If the two dimensional images are created by a single exposure of the camera, then either multiple exposures of the enlarger are required to print the three dimensional photograph or at least one of the elements of the lenticular print system must be moved during a single exposure of the enlarger. If the two dimensional images are printed by one exposure of the enlarger and without moving at least one of the above elements of the lenticular print system, then the two dimensional images must be created by multiple exposures of the camera or by moving at least one element of the imaging system during a single exposure of the camera. In the invention, creating two dimensional images with the camera, and printing three dimensional images with the enlarger does not require multiple exposures of the imaging system or the lenticular print system, or moving elements of the imaging system or the lenticular print system.

SUMMARY OF THE INVENTION

The present invention provides a method and apparatus for one-step imaging of a plurality of discrete two dimensional images with a multi-lens camera, and one-step printing of three dimensional images with a multi-lens enlarger on a lenticular screen. Lenticular screens are well known in the art and consist of a plurality of linear lenses, or lenticula, that are parallel to each other and situated above a focal plane in contact with a photosensitive material. Typically, the photosensitive material is fixed to the lenticular screen on the focal plane.

There are four major items of concern to a person of ordinary skill attempting to produce a lineiform image for use in three dimensional photographs utilizing lenticular technology:

1) ensuring that there are no gaps between the zones of the lineiform image; 2) ensuring that there are no gaps between the lines of the lineiform image; 3) ensuring that there are a sufficient number of discrete two dimensional images to produce a three dimensional image without stroboscopic effect; and 4) ensuring that the two dimensional images are correctly amalgamated onto the focal plane of the lenticular screen. The invented method and apparatus addresses and overcomes each of these concerns in a practical and workable system by redefining the conceptual model of the lenticular system to permit the production of a continuous lineiform image without gaps between zones and without gaps between lines, thereby producing a superior quality three dimensional photograph.

To ensure that there are no gaps between the zones of the lineiform image, the previously accepted theory of stereoscopic imaging required that each zone occupy the exact width of the space under a lenticula. However, it has been discovered that to satisfy each of the above items of concern, the zones of the lineiform image must be allowed to occupy a space larger than the exact width of the space under a lenticula. In reality, zone width varies with the distance of the plane of projection, also referred to herein as the plane of the projecting apertures, from the lenticular screen. Mathematically, the width of a zone is defined by the formula $w((f/h)+1)$; where w is the width of the lenticula, f is the focal length of the lenticula, and h is the distance from the plane of the projecting apertures to the plane of the optical centers of the lenticular screen.

In practice, however, it has been discovered that all that need be determined is the length of the chord of the angle which if effectively filled with projecting apertures produces a lineiform image without gaps between zones. This angle is called the accepting angle. Accepting angles are graphically depicted in FIGS. 9 and 10. For any given distance from the plane of the optical centers 20 of the lenticular screen 10 to the plane 180 of the projecting apertures 182, 186, 188 the length of the chord 88 of the accepting angle is equal to the distance which must be moved in a direction parallel to the lenticular screen and perpendicular to the direction of the lenticulas between a first spot from which the lenticular screen appears brightest through a darker region to a second spot from which the lenticular screen appears brightest once again.

To find the actual accepting angle, the chord of the accepting angle is then centered over the area of lenticular screen that the photographer desires to use. The length of this chord is also given by the formula $w((h/f)+1)$. By filling the length of the chord of the accepting angle with projecting apertures, there will be no gaps between the zones of the lineiform image, thus resulting in a superior quality three dimensional image. For any given distance from the plane of the optical centers of the lenticular screen to the plane of the projecting apertures, the chord defined by the accepting angle is also defined by an angle equal to the aperture angle with its vertex placed on the focal plane of the lenticular screen, as illustrated in FIG. 6.

Gaps between adjacent lines of the lineiform image can be eliminated by using a number of projecting apertures greater than the number of lines that can be resolved by a single lenticula within one zone of the lineiform image, where the width of the zone is determined by the minimum viewing distance. Thus, the adjacent lines of the lineiform image overlap.

The stroboscopic effect seen in so many lenticular screen photographs can also be reduced, or eliminated, by using a sufficient number of two dimensional images. To eliminate stroboscopic effect for any element, elements, or any portion of an element in objective space, the number of two dimensional images created by the camera should be greater than the number of lines defining the edges of an image having similar sharpness and contrast that the human eye can resolve over a distance equal to the largest single parallax from a preselected minimum viewing distance of the resulting three dimensional image. The term largest single parallax refers to the distance on the focal plane of the lenticular screen between the two images of the same element in objective space projected by the outermost lenses of the enlarger which is the largest of the distances between the two images of those elements which the photographer wishes to be free from stroboscopic effect.

The invention solves the last problem, that of amalgamation, by standardizing the row of two dimensional images projected on the recording medium. Standardization is achieved through the use of a predetermined standard of arrangements which is common to both the camera (which creates the two dimensional images to be projected onto the lenticular screen) and the enlarger (which projects the two dimensional images onto the lenticular screen and prints the lineiform image). Initially, the lenses of the camera and the lenses of the enlarger are both calibrated to this same predetermined standard of arrangements. Thereafter, when moving the optical elements of either the camera or the enlarger they must be moved in proportion relative to the predetermined standard of arrangements. Through the use of this standard of arrangements, the two dimensional images are properly amalgamated, thus producing a sharp lineiform image.

OBJECTS OF THE INVENTION

The principal object of the invention is to provide a method and apparatus for producing a superior quality three dimensional image in less time than heretofore required.

Another object of the invention is to provide a method and apparatus for creating a plurality of two dimensional images of at least one element in objective space with a multi-lens camera in a single exposure, and for printing a three dimensional image with a multi-lens enlarger in a single exposure.

Another object of the invention is to provide a method and apparatus for producing a lineiform image without gaps between zones and without gaps between lines.

Another object of the invention is to provide a method and apparatus for producing a three dimensional image without stroboscopic effect.

Another object of the invention is to provide a method and apparatus for producing a three dimensional image wherein the amalgamation of images requires less labor than previously required.

Another object of the invention is to provide a method and apparatus for producing a three dimensional image with orthoscopic effect.

Another, and more particular, object of the invention is to provide a method and apparatus for producing a three dimensional image which is perceived as a stable, coherent image when viewed from any reasonable distance within the limits of the accepting angle defined by the distance between the plane of the projecting apertures and the plane of the optical centers of the lenticular screen.

Another, and more particular, object of the invention is to provide a method for measuring the length of the chord of the central resolution angle of a lenticular lens system.

Another, and more particular, object of the invention is to provide a method for determining the resolution characteristics of a retro-reflective lens system.

Another, and more particular, object of the invention is to provide a common standard of arrangements for the multi-lens camera and the multi-lens enlarger of a system for producing a stereoscopic image.

BRIEF DESCRIPTION OF THE DRAWINGS

The foregoing and other objects will become more readily apparent by referring to the following detailed description and the appended drawings in which:

FIG. 19 shows the distances between the secondary axes of a series of adjacent projecting apertures which are linearly arrayed, but whose centers are slightly non-collinear (a), and two rows of projecting apertures; one of which is positioned at the Plane of the Distance Limit disclosed herein (b);

DETAILED DESCRIPTION OF THE PREFERRED EMBODIMENTS

I. Method

In the following description, the method of the invention is described with reference to the printing, or composing, steps. However, one skilled in the art will recognize that the discussion is also relevant to the imaging steps, i.e., the steps of creating a plurality of discrete two dimensional images of at least one element in objective space. Both the figures and the following discussion refer to "lenses" and "projecting apertures" as a single element. However, one skilled in the art will recognize that the figures and discussion are also relevant to compound lenses. Further, one skilled in the art will recognize that it is possible to create multiple two dimensional images using a single lens of a camera, or to project multiple two dimensional images using a single lens of an enlarger. For purposes of description and not by limitation, the following discussion assumes that each discrete two dimensional image is created by a single lens of a camera, and is projected by a single lens of an enlarger having a single projecting aperture. Thus, the number of lenses of the camera is equal to the number of lenses of the enlarger.

"Composing" refers to the steps involved in producing a photographic print with an enlarger. The invention utilizes the indirect method of producing three dimensional photographs wherein a plurality of discrete two dimensional images of at least one element in objective space are photographed with a linearly arrayed, multi-lens camera. During composing, the row of two dimensional images created on the film of the camera is projected through a multi-lens enlarger onto a lenticular screen that is coated, or is in contact with, a photosensitive material.

Figure 7:
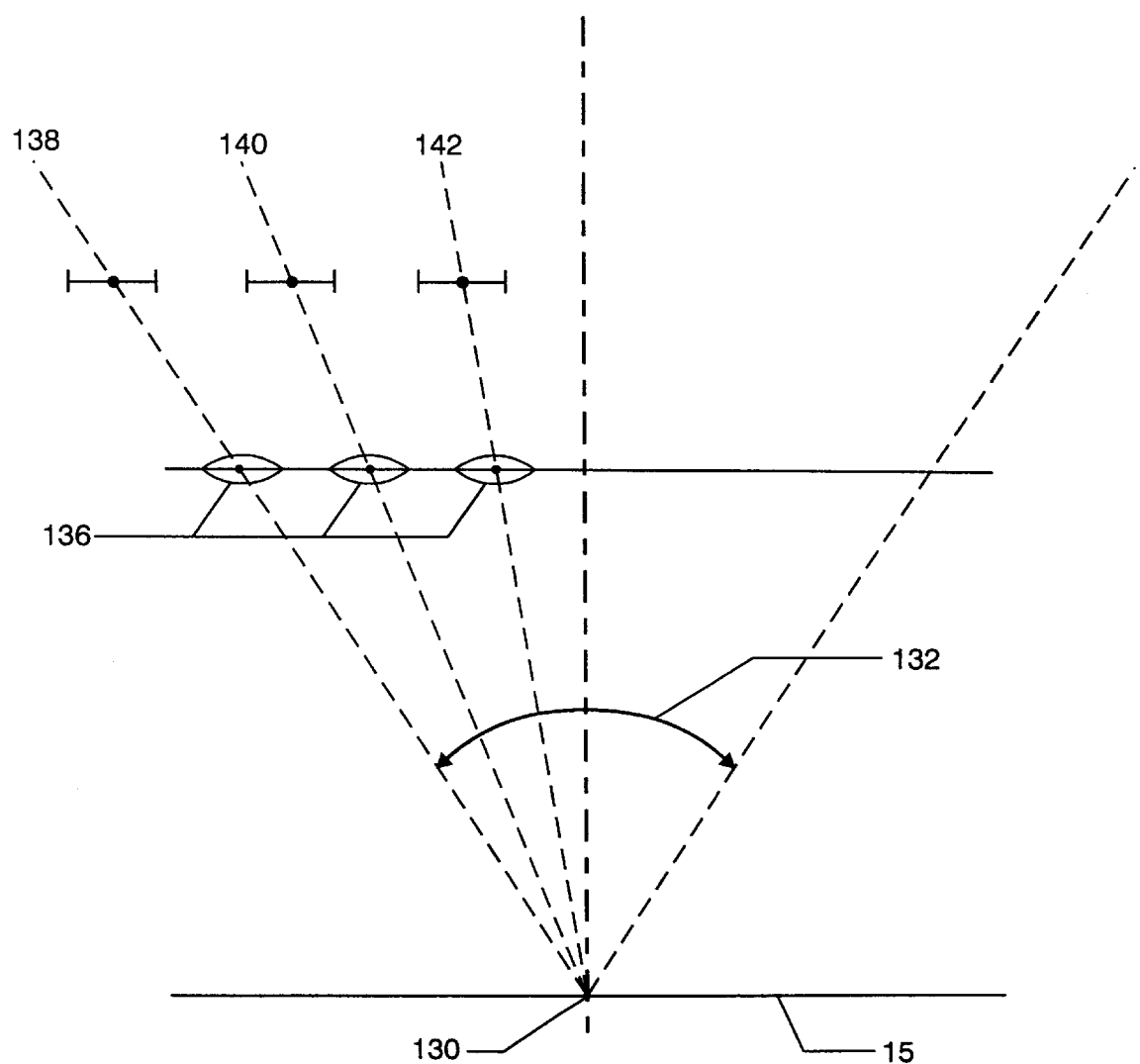
FIG. 7 is a graphic depiction of the looking angle, the looking plane, the looking point and the looking directions of the lenses of a camera.
Figure 8:
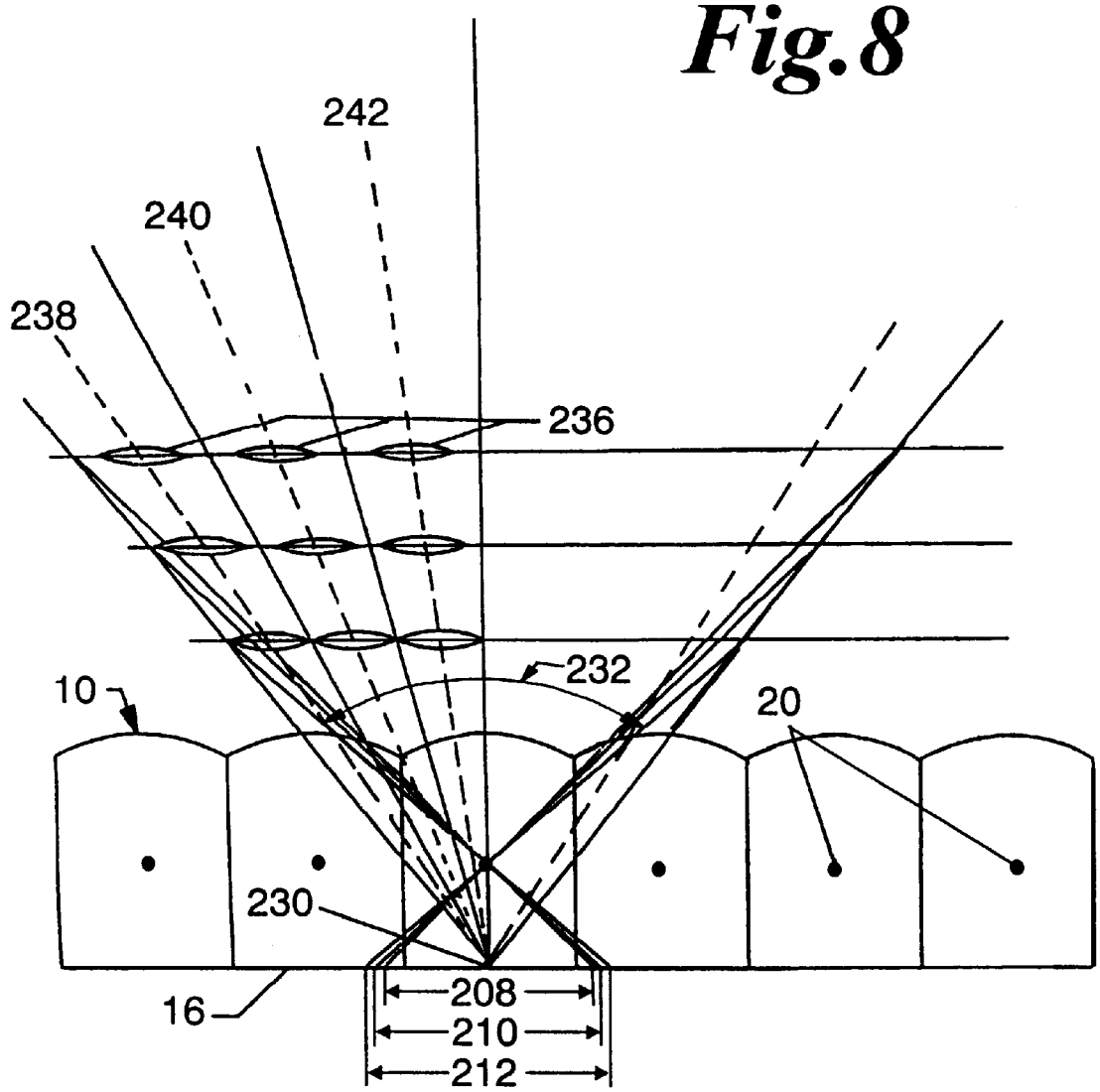
FIG. 8 illustrates a method in accordance with the invention for moving the lenses of the enlarger radially within the accepting angle.

To obtain correctly proportioned orthogonal relationships, referred to herein as orthoscopic effect, the looking angle of the camera (FIG. 7) should equal the printing angle of the enlarger (FIG. 8). In other words, the camera should "cover" the same angle as the enlarger. The method of the invention is particularly concerned with improving and refining the composing steps using an apparatus designed in accordance with the invention. Accordingly, the invention provides a method and apparatus for producing superior quality three dimensional images using a one-step imaging and a one-step composing process.

It should be recognized that the lines of the lineiform image necessarily cannot be uniform in width. Further, only by accounting for the actual behavior of the light projected through the lenticular screen can composition of a superior quality three dimensional image be achieved. Throughout the following description, the term "lenticula" refers to a single optical lens of a lenticular screen. It is important to recognize that each lenticula is, in effect, a bead or ridge extending the entire length of the lenticular screen. Thus, reference to "the direction of a lenticula" refers to the direction of the line formed by the ridge of the lenticula.

A line parallel to the direction of a lenticula is parallel to the ridge formed by the lenticula and also parallel to the focal plane. Similarly, a line perpendicular to the focal plane is also perpendicular to the direction of each and every lenticula. Thus, it is possible to define a line that is parallel to the focal plane and at the same time perpendicular to the direction of the lenticulas, i.e., a line that lies at a right angle to the ridges formed by the lenticulas. As referred to herein, the "main optical axis" of a lens, for example a lenticula, is the axis perpendicular to the focal plane which passes through the optical center of the lens. Thus, the main optical axis of each lenticula is perpendicular to the direction of the lenticula.

Figure 1:
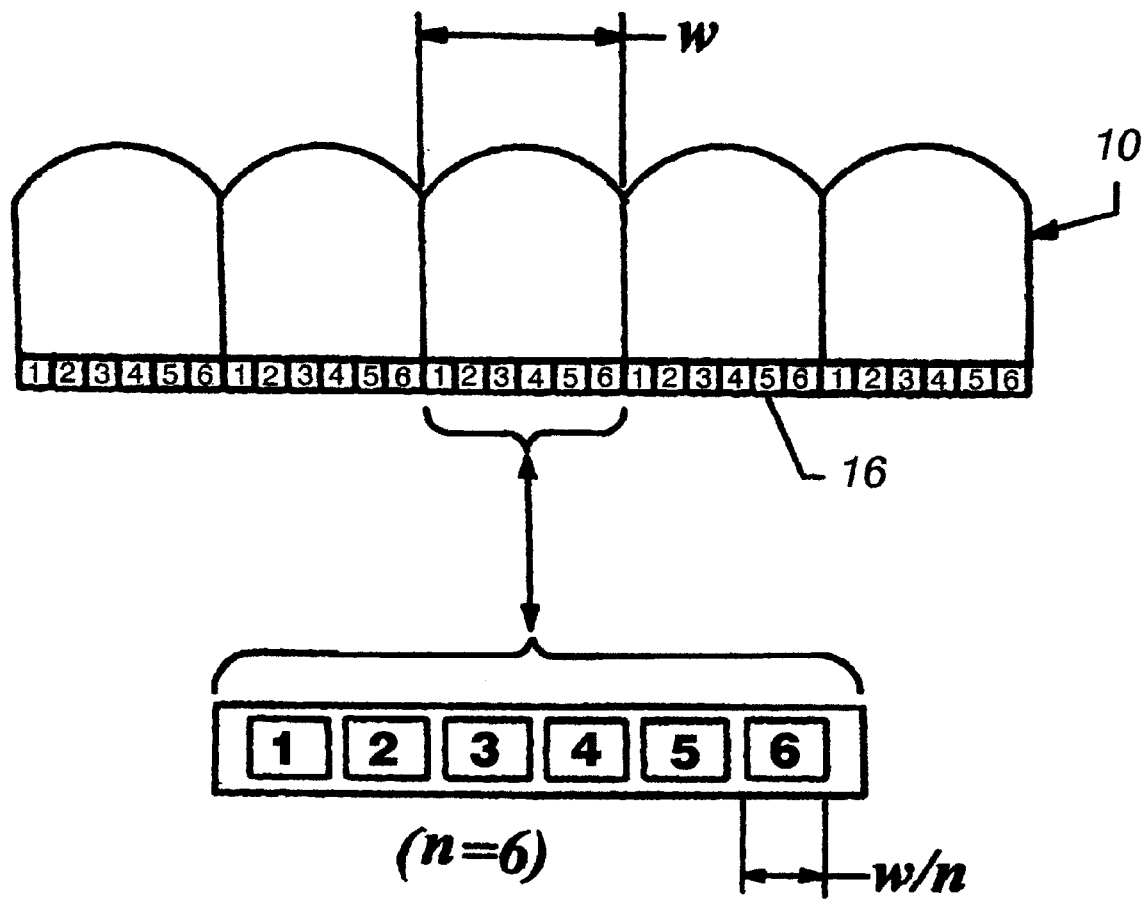
FIG. 1 depicts a conceptual model of a lineiform image as disclosed by the prior art.

An important discovery of the method and apparatus of the invention is that the zones of the lineiform image should not be forced to occupy the exact width of the space under a lenticula. Each lenticula is not an independent unit, but instead is a small part of a whole system that should be created around a mathematical model. FIG. 1 illustrates a conceptual model of a lineiform image as described by the prior art wherein the width of each zone is limited to the exact width of the space under a lenticula. The width of each line of this lineiform image is w/n; where w is the width of each lenticula and n is the number of two dimensional images used during composition. To fill only the exact width w of the space under a lenticula, the aperture angle of the lenticula must be effectively filled with projecting apertures. The aperture angle of a lenticula is that angle which is formed by passing rays originating from where perpendicular projections of the edges of the lenticula meet the focal plane through the optical center of the lenticula. Angle 70 in FIG. 4, for example, is the aperture angle having rays passing through the optical centers 20 of the lenticulas 12.

Figure 2:
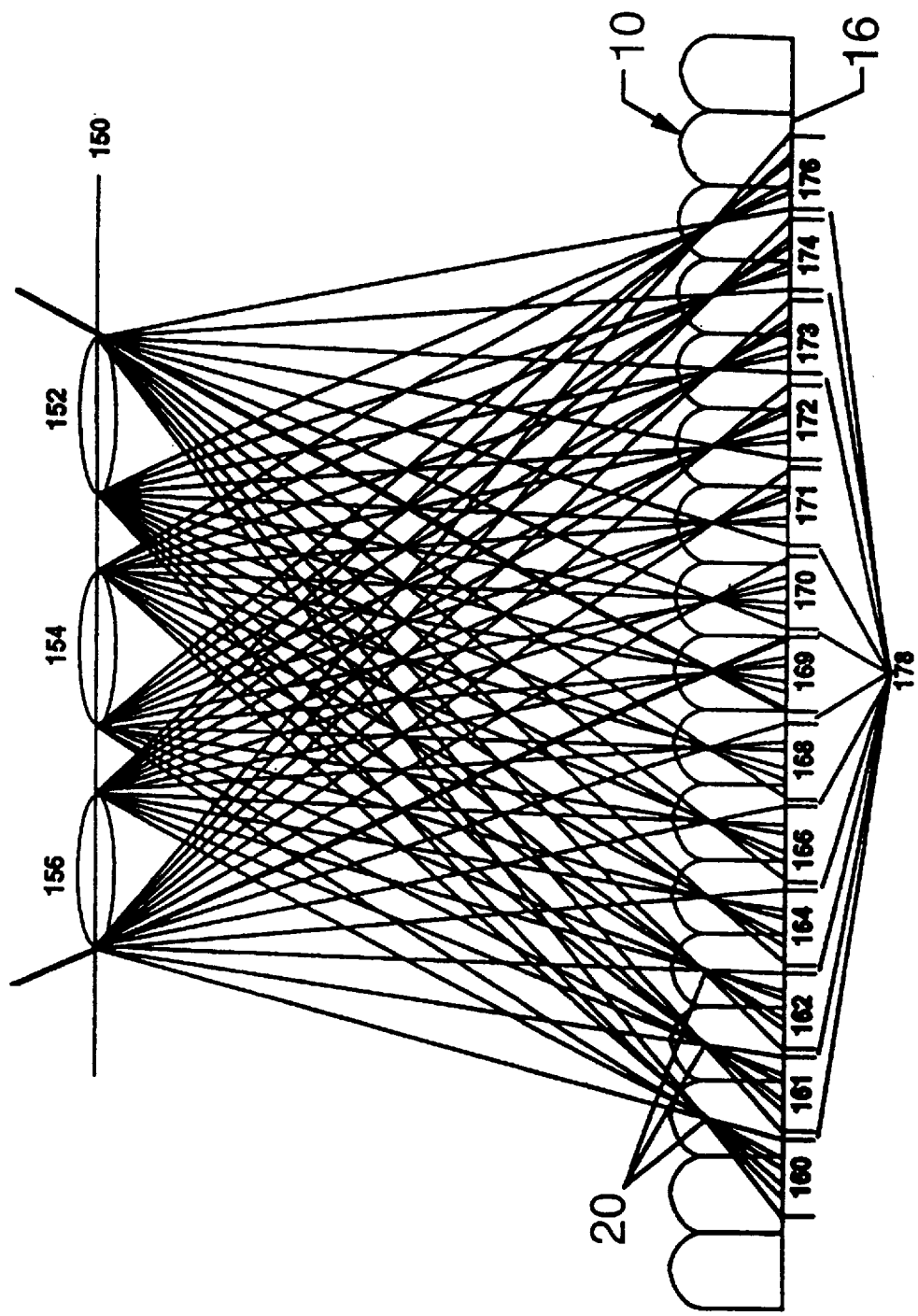
FIG. 2 illustrates the disadvantage of the prior art, which fills only the aperture angle with projecting apertures, so that there are gaps between zones.

It follows that to achieve a match between the zones of the lineiform image and the spaces under the lenticulas, the aperture angle of each lenticula of the lenticular screen must be filled with projecting apertures. Stated differently, unless measures are taken during composition to fill the aperture angle of each lenticula with projecting apertures, gaps between zones of the lineiform image will result. FIG. 2 shows three projecting apertures 152, 154, 156 situated on plane 150 to effectively fill the aperture angle of the center lenticula. When a plurality of images are projected though the projecting apertures 152, 154, 156, gaps 178 are formed between each of the zones 160 through 176. Therefore, when viewing a three dimensional image through the lenticular screen 10 shown in FIG. 2, a viewer will perceive a loss of the three dimensional image produced as a result of a change in the viewing angle.

Figure 3:
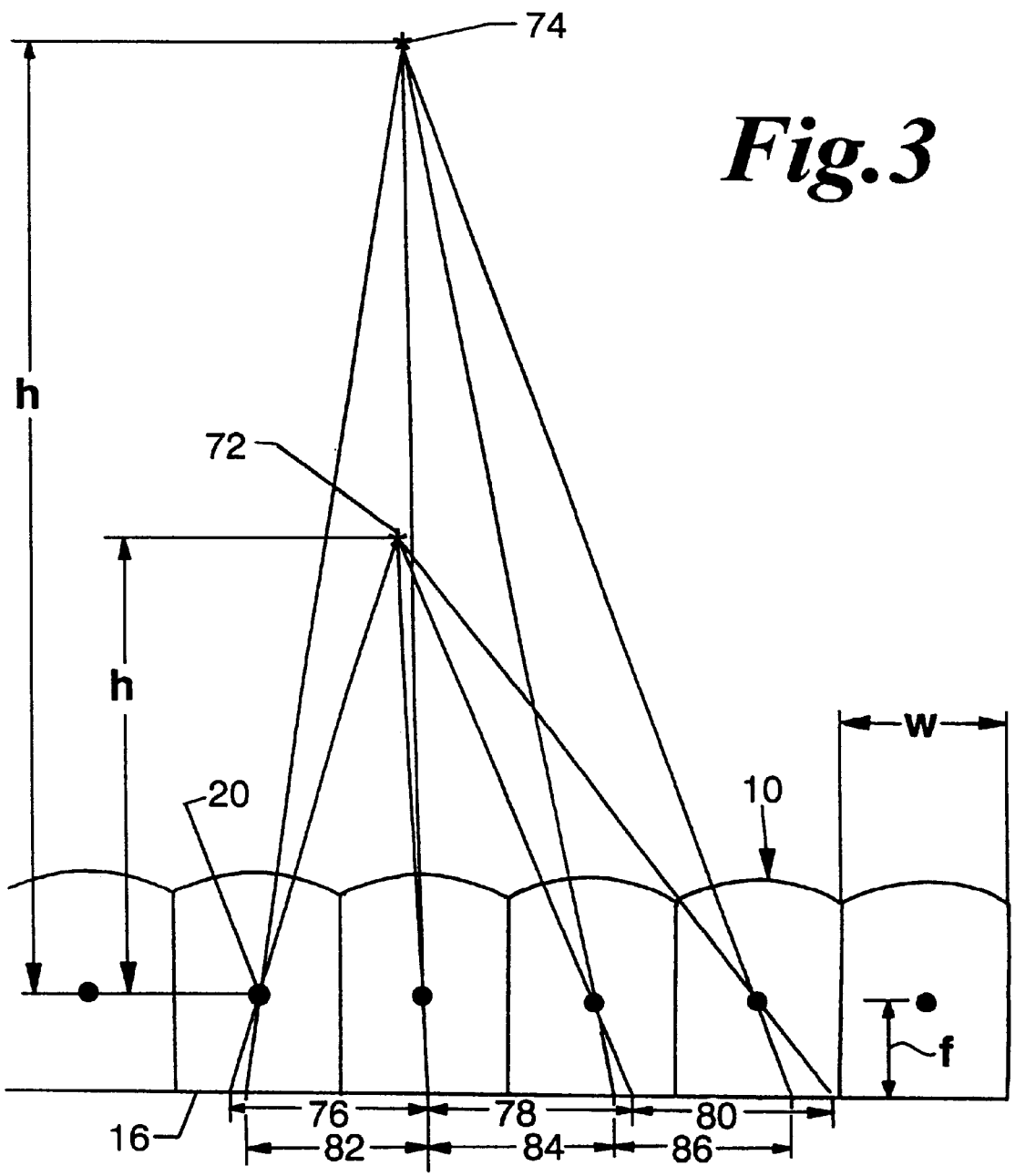
FIG. 3 is a graphic depiction o f how the width of a zone varies with the distance of a projecting aperture from the plane of the optical centers of the lenticular screen.

The width of a zone is actually a function of the distance from the plane of projection, also referred to herein as the plane of the projecting apertures, to the plane of the optical centers of the lenticular screen. FIG. 3 shows a point source of light projected onto a lenticular screen from two positions 72, 74 located at different perpendicular distances h from the plane of the optical centers 20 of the lenticular screen 10. The lines of the lineiform image recorded are spread across a width greater than the width of the space under a lenticula. The widths between the successive lines recorded on the focal plane 16 of the lenticular screen 10 are equal for each distance h, i.e., 82=84=86, and 76=78=80. Thus, the width of a zone varies with the distance h of the plane of the projecting apertures from the plane of the optical centers 20 of the lenticular screen 10.

Mathematically, the width of a zone is given by the formula w((f/h)+1); where w is the width of each lenticula, f is the focal length of each lenticula, and h is the distance of the plane of the projecting apertures from the plane of the optical centers of the lenticular screen. Geometrically, the width of a zone of the lineiform image is equal to the distance between the two successive lines of the lineiform image of a point projected onto the lenticular screen through adjacent lenticulas. Therefore, to allow composing in a single step without creating gaps between the zones, a line segment wider than the chord of the aperture angle must be filled with projecting apertures.

Figure 4:
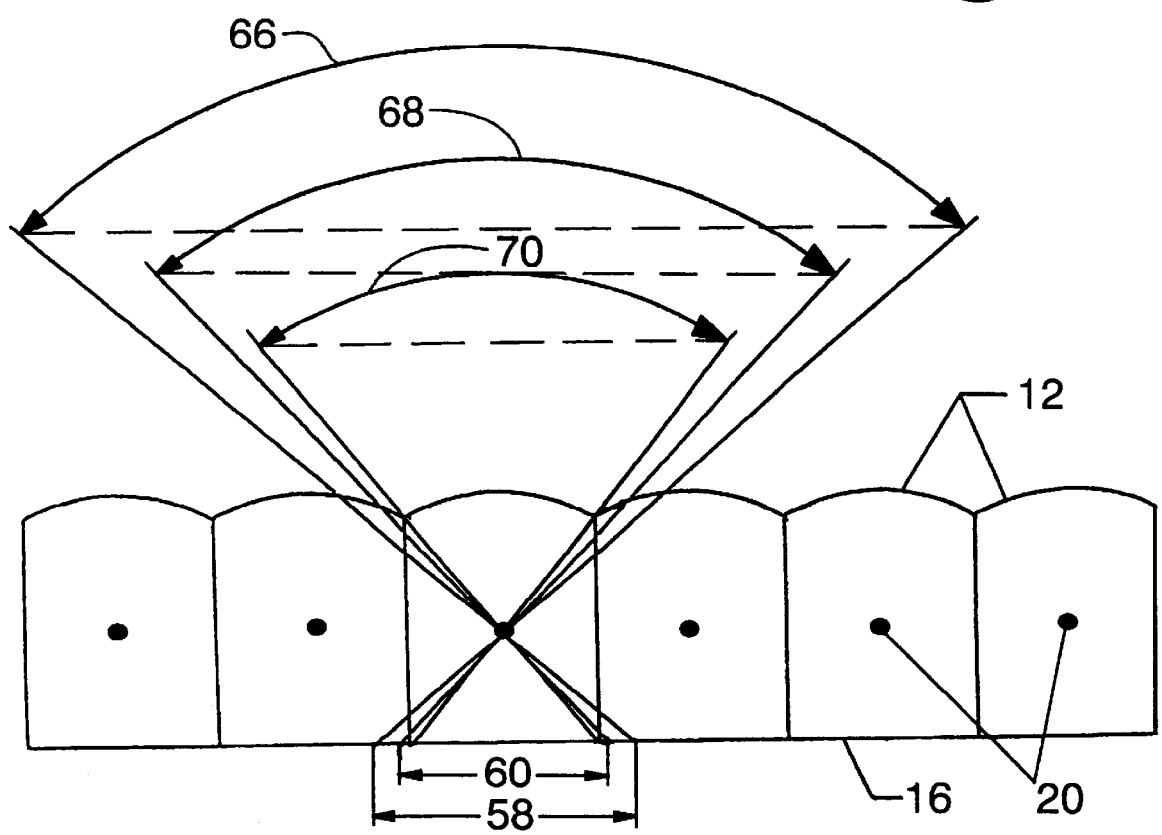
FIG. 4 is a graphic depiction of two different accepting angles and an aperture angle.
Figure 10:
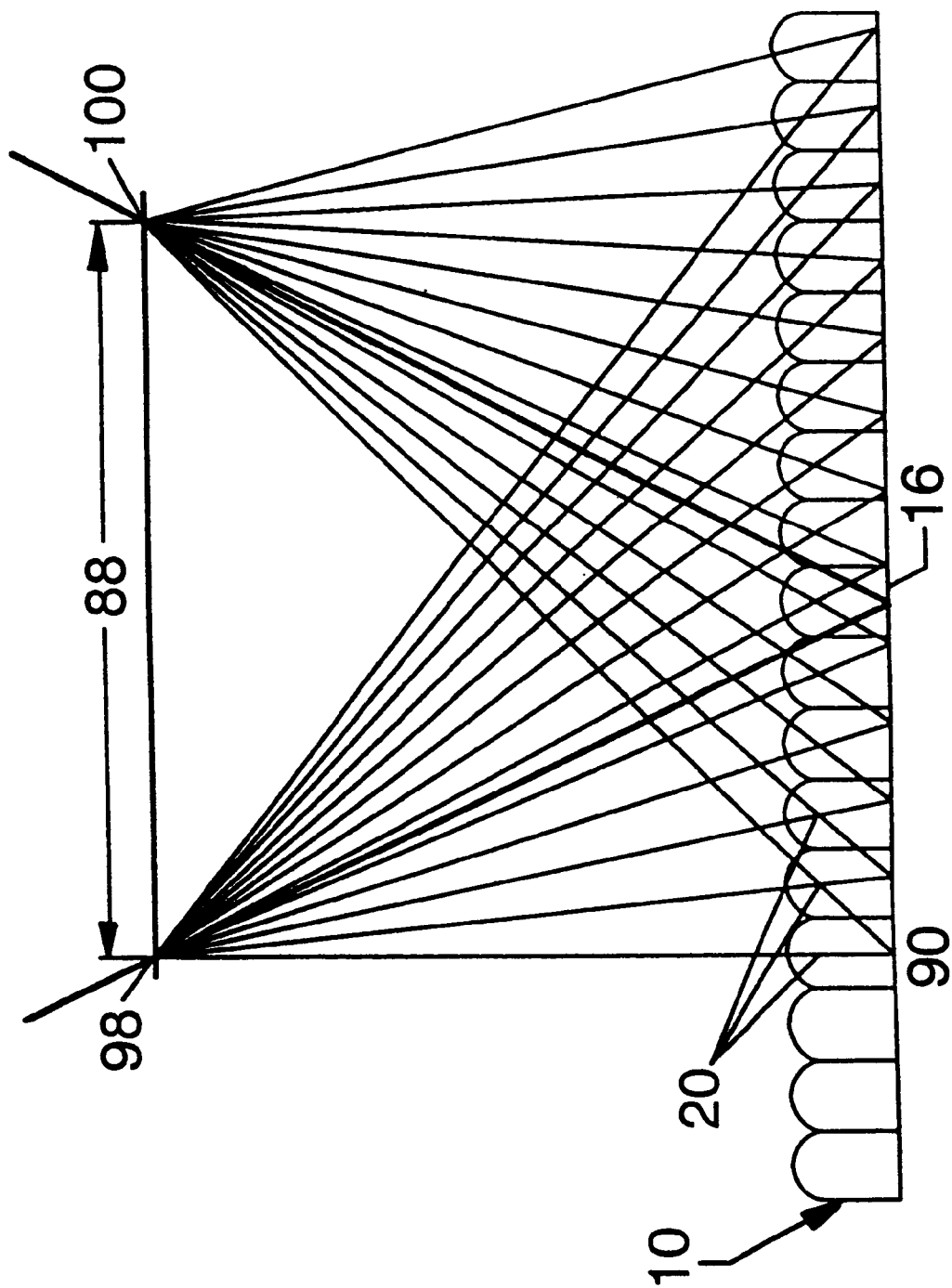
FIG. 10 illustrates that projecting a point source of light along a line segment not equal to the length of the chord of the accepting angle produces zones of the lineiform image without gaps between zones of the lenticular screen.

The accepting angle of a lenticular print system is the angle formed by centering a zone of the lineiform image under a lenticula on the focal plane and then projecting the edges of the zone through the optical center of the lenticula. For example, FIG. 4 shows two accepting angles 66, 68 for different projecting distances from the plane of the optical centers of the lenticular screen. Each accepting angle 66, 68 produces a zone having a width 58, 60, respectively. As used herein, "at the chord of the accepting angle" refers to the line segment of the line parallel to the focal plane and perpendicular to the direction of the lenticulas between the sides of the accepting angle in the plane of projection from which the accepting angle is formed. For example, line segment 88 in FIG. 10 is the chord of the accepting angle passing through the points 98 and 100 on the plane parallel to the plane of the optical centers 20 of the lenticular screen 10. In general, the term "chord" as used herein refers to a line segment connecting the sides of an angle which is perpendicular to the bisector of the angle. If a line segment equal to the length of the chord of the accepting angle is filled with projecting apertures as described herein, the zones of the lineiform image will line up under the lenticular screen without gaps.

Figure 5:
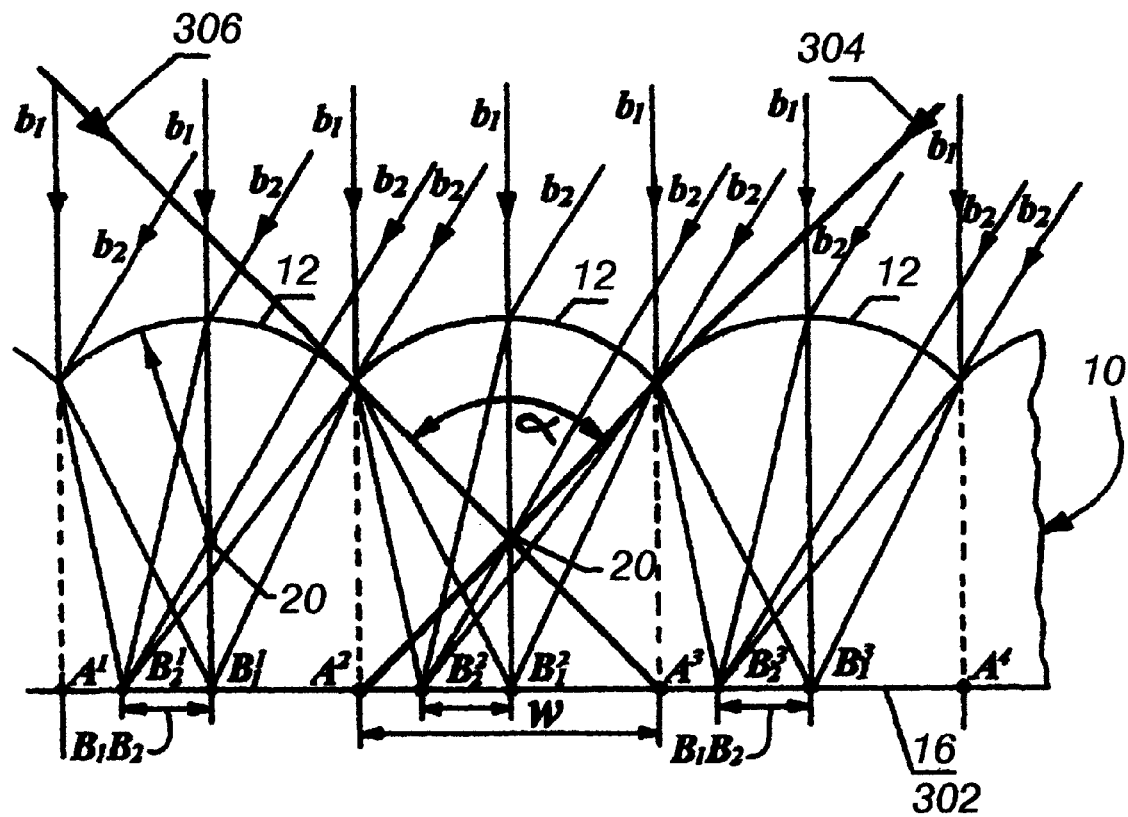
FIG. 5 is a graphic depiction of the aperture angle of a given lenticular screen.
Figure 6:
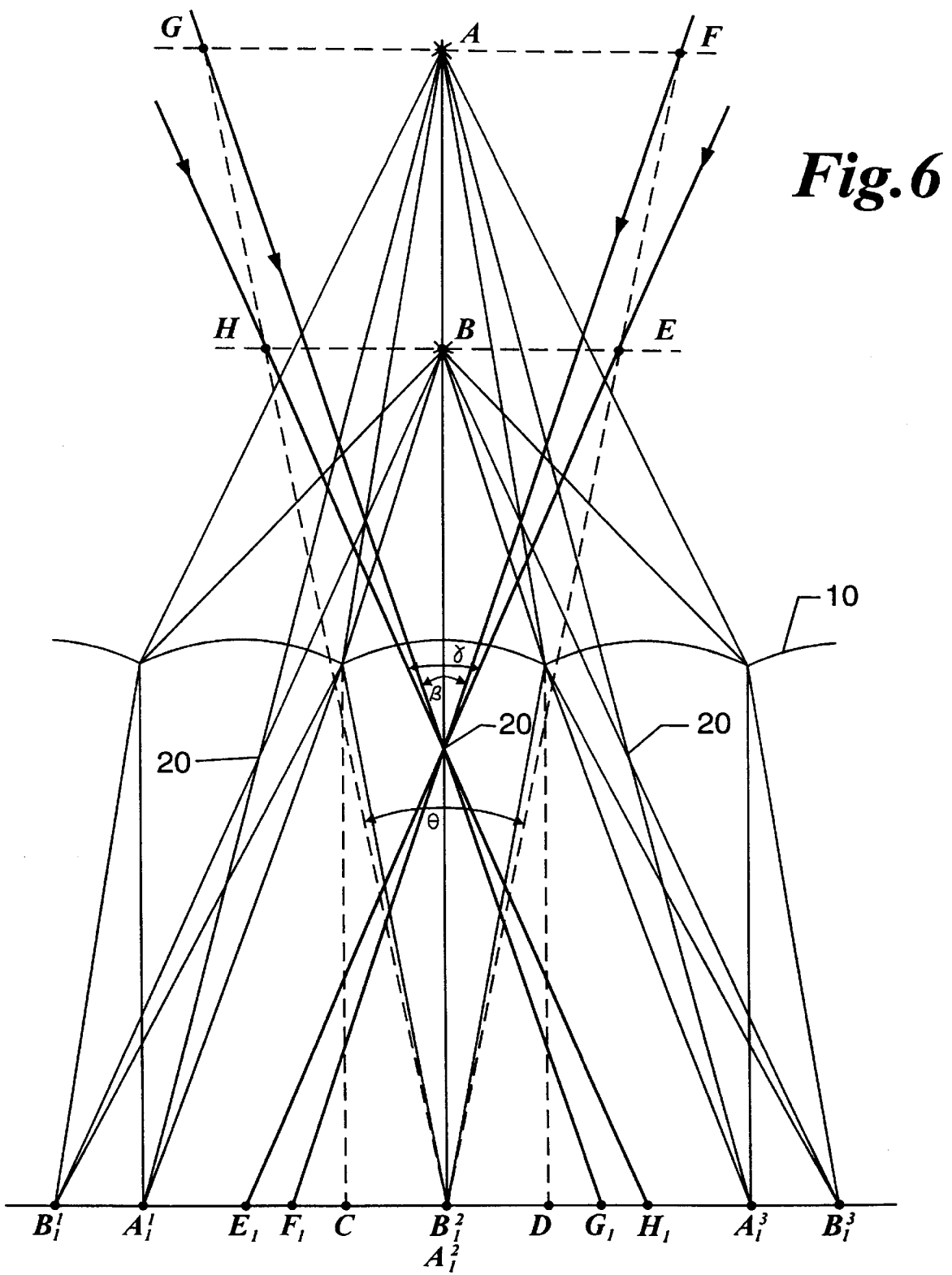
FIG. 6 illustrates the relationship between two accepting angles and the chords of the respective accepting angles.

Aperture angle alpha ($\alpha$), shown in FIG. 5, is determined by theoretical parallel beams of light $b_1$ and $b_2$. Parallel beams, however, are never used in photo-projections or in taking photographs. In practice, only radial beams are used. In FIG. 6, two point sources of light A and B radiate light onto lenticular screen 10 which focuses the beams at points $A_1^{(1,2,3)}$ and $B_1^{(1,2,3)}$ respectively. The distances between $A_1^1$ and $A_1^2$, and between $A_1^2$ and $A_1^3$, are zones of the lineiform image and are equal to one another, and are wider than the width CD of each lenticula. The zones between $B_1^1$ and $B_1^2$, and between $B_1^2$ and $B_1^3$, are likewise equal to one another and wider than the width CD of each lenticula; but further, are wider than the zones between $A_1^1$ and $A_1^2$, and between $A_1^2$ and $A_1^3$. The width of a zone depends on the distance between the light source and the lenticular screen, and zones are always wider than the width of a lenticula within the limits of the method and apparatus of the invention.

For convenience, the line segments $F_1G_1$ and $E_1H_1$ representing the widths of the zones are shown directly under the central lenticula. To expose the line segment $F_1G_1$ on the photosensitive material, point light source A must illuminate the lenticular screen 10 while moving between points F and G located on the sides of angle beta ($\beta$) at a constant distance from the lenticular screen. The length of the line segment $E_1H_1$ is greater than the length of the line segment $F_1G_1$, therefore point light source B must illuminate the lenticular screen 10 across a wider angle while moving between points E and H located on the sides of angle gamma ($\gamma$). Analogously, all of the zones of the lineiform image corresponding to the remaining lenticulas will be filled. Thus, the lenticular screen can receive light from a point source without creating gaps on the focal plane 16 between zones of the lineiform image if the source fills a definite angle with light. The definite angle depends on the distance between the plane of projection of the light source and the plane of the optical centers of the lenticular screen.

The definite angle is the accepting angle for the given distance between the plane of projection of the light source and the plane of the optical centers of the lenticular screen. In FIG. 6, two accepting angles β and γ are shown. The line segments GF and HE are the chords of the accepting angles β and γ, respectively, at the given distances. The length of each chord depends on the accepting angle and the distance of the chord from the lenticular screen. In particular, for the given distances from the plane of the optical centers 20 of the lenticular screen 10 to the planes of projection GAP, HBE, the chords GF, HE defined by the accepting angles β, γ are also defined by an angle theta (θ) equal to the aperture angle with its vertex placed on the focal plane 16 of the lenticular screen 10.

Known designs of lenticulas and lenticular screens are described in detail in U.S. Pat. No. 3,494,270 to Shibata at column 3, lines 8–27, and lines 61–74, and FIGS. 1, 2, and 5. FIG. 5 herein shows a conventional lenticular screen 10 comprised of a plurality of cylindrical lenses, or lenticulas 12 on one surface of a transparent plate. The plate has a second surface 302 that coincides with the focal plane 16 of each of the lenticulas 12 of the lenticular screen 10. As with all lenses, each lenticula has an optical center 20. Due to the cylindrical shape of the lenticula, its optical center is a continuous line perpendicular to the plane of FIG. 5.

Thus, the optical centers 20 of the lenticulas are linear and parallel to the axes of the cylindrical surfaces of the lenticulas 12. Likewise, the focuses $B_1^1$, $B_1^2$, and $B_1^3$ of the lenticulas 12 are linear and parallel to the axes of the cylindrical surfaces of the lenticulas. A purpose of the lenticular screen is to separate beams of light that strike the screen at different angles and to project linear images in a rearward direction. The separation of beams in cylindrical lenticulas occurs along the linear optical centers of the lenticulas. Therefore, to explain the working of a lenticular screen, only a cross sectional view of the screen need be shown and described. However, the linear extension of all the parameters depicted in the cross sectional view must be kept in mind. All points on the cross sectional view are in reality lines parallel to the linear optical centers of the lenticulas, and all lines on the cross sectional view are in reality planes parallel to the linear optical centers. Any reference to position relative to the lenticulas, such as parallel, perpendicular, etc., also refers to the linear optical centers of the lenticulas to determine a common direction of extension of the lenticulas and their features.

The consequence of separate parallel beams, as the previously known methods and apparatus assume, striking the lenticular screen 10 at different angles is illustrated in FIG. 5 where light beams $b_1$, parallel to each other and perpendicular to the focal plane 16, strike the lenticular screen and gather at points $B_1^1$, $B_1^2$, and $B_1^3$. Beams $b_2$, parallel to each other, strike the lenticular screen 10 at an angle other than perpendicular and gather at points $B_2^1$, $B_2^2$, and $B_2^3$. The equal distances $B_1B_2$ between the points depict the expected separation of beams $b_1$ and $b_2$ on the focal plane 16. For complete exposure of the photosensitive material bonded to, or in contact with, plane 302, it is necessary to expose the lenticular screen 10 with parallel beams in direction 304 and, without interruption, change (twist) the direction of the parallel beams to direction 306. The angle α through which the parallel beams are twisted is the aperture angle of the lenticular screen 10. In this case, focused beams project from $A^1$ to $A^2$, from $A^2$ to $A^3$, and from $A^3$ to $A^4$ simultaneously, and the photosensitive material is exposed completely without gaps. Thus, the prior methods and apparatus hypothesize that the distances $A^1A^2$, $A^2A^3$, and $A^3A^4$ are equal to the width w of the lenticulas 12.

When setting up a camera or an enlarger to produce a three dimensional image, there are five basic factors which must be considered if a superior quality three dimensional image is to be achieved:

1. The distance from the film in the camera to the looking plane, and the distance from the film in the enlarger to the lenticular screen;
2. The length of the line segment to be filled with projecting apertures;
3. The number of projecting apertures to be used;
4. The size and spacing of the projecting apertures; and
5. Calibration of both the camera and the enlarger to a standard of arrangements to achieve correct amalgamation of the two dimensional images on the lenticular screen.

1. The distance from the film in the camera to the looking plane, and the distance from the film in the enlarger to the lenticular screen.

Because the optimum viewing distance of the three dimensional photograph is largely determined by the distance between the lenticular screen and the enlarger during composition, the distance from the lenticular screen that the lenses of the enlarger should be placed is equal to the desired viewing distance of the printed three dimensional photograph. If the looking angle of the camera is equal to the printing angle of the enlarger, and if both the camera and the enlarger are set for the same viewing distance, the preselected looking plane of the camera will match the plane of the lenticular screen in the resulting photograph. For example, if lenses 236 in FIG. 8 are the lenses of the enlarger and lenses 136 in FIG. 7 are the lenses of the camera, and the printing angle 232 (FIG. 8) is equal to the looking angle 132 (FIG. 7), then the focal plane 16 (FIG. 8) of the lenticular screen 10 will correspond to the looking plane 15 (FIG. 7) of the camera.

To one skilled in the art, it is understood that for the multi-lens camera shown in FIG. 7, the looking directions 138, 140, 142 of the camera's lenses (which correspond to the projecting directions 238, 240, 242 of the enlarger in FIG. 8) converge at a single point 130 in objective space termed the looking point (which corresponds to the point 230 in FIG. 8). The plane passing through this point and perpendicular to the main optical axes of the lenses is the looking plane 15. Regardless whether the main optical axes of the lenses 136 of the camera are parallel, the looking directions 138, 140, 142 are defined by lines joining the looking point 130 on the looking plane 15 with the optical centers of the lenses 136 of the camera. Typically, the lenses 136 of the camera and the frames of the film are positioned symmetrically about the center line of the camera as indicated by the broken lines in FIG. 7. Thus, the looking point 130 is located at the intersection of the axis of symmetry of the camera and the looking plane 15.

If the camera and the enlarger are designed such that the distance from the plane of the film in the camera to the looking plane can be made equal to the distance from the plane of the film in the enlarger to the focal plane of the lenticular screen, the resulting three dimensional image can be made orthoscopic. In this case, the photographer is not required to position the looking plane at a "key" element in the photograph, as that term is used in U.S. Pat. No. 3,953,869 to Wah Lo. In fact, the photographer is not required to position the looking plane at any element in the photograph. As a result, the key element will not be perceived to be on the lenticular screen of the photograph. For example, if the key element is ten yards behind the looking plane of the camera, then the key element will be perceived to be ten yards behind the focal plane of the lenticular screen in the photograph. The blurring (i.e., sharpness) of the elements in the stereoscopic image depends on the number of discrete two dimensional images necessary to avoid stroboscopic effect and the resolving capability of the lenticular screen. Achieving this result, however, requires the use of the standard of arrangements described hereinafter.

In the invention, the looking plane of the camera is to be associated with the plane of the lenticular screen of the resulting photograph. As used herein, the plane of the lenticular screen is substantially the same as the plane of the optical centers of the lenticulas and the focal plane of the lenticular screen because the thickness of the lenticular screen is small relative to the projecting distance. Any object which is physically located on the looking plane in objective space when the two dimensional images are created by the camera will be perceived to be on the plane of the lenticular screen of the resulting photograph. Similarly, any object in spaced relation away from the looking plane will be in the same spaced relation with the plane of the lenticular screen of the resulting photograph.

2. The length of the line segment to be filled with projecting apertures.

Figure 9:
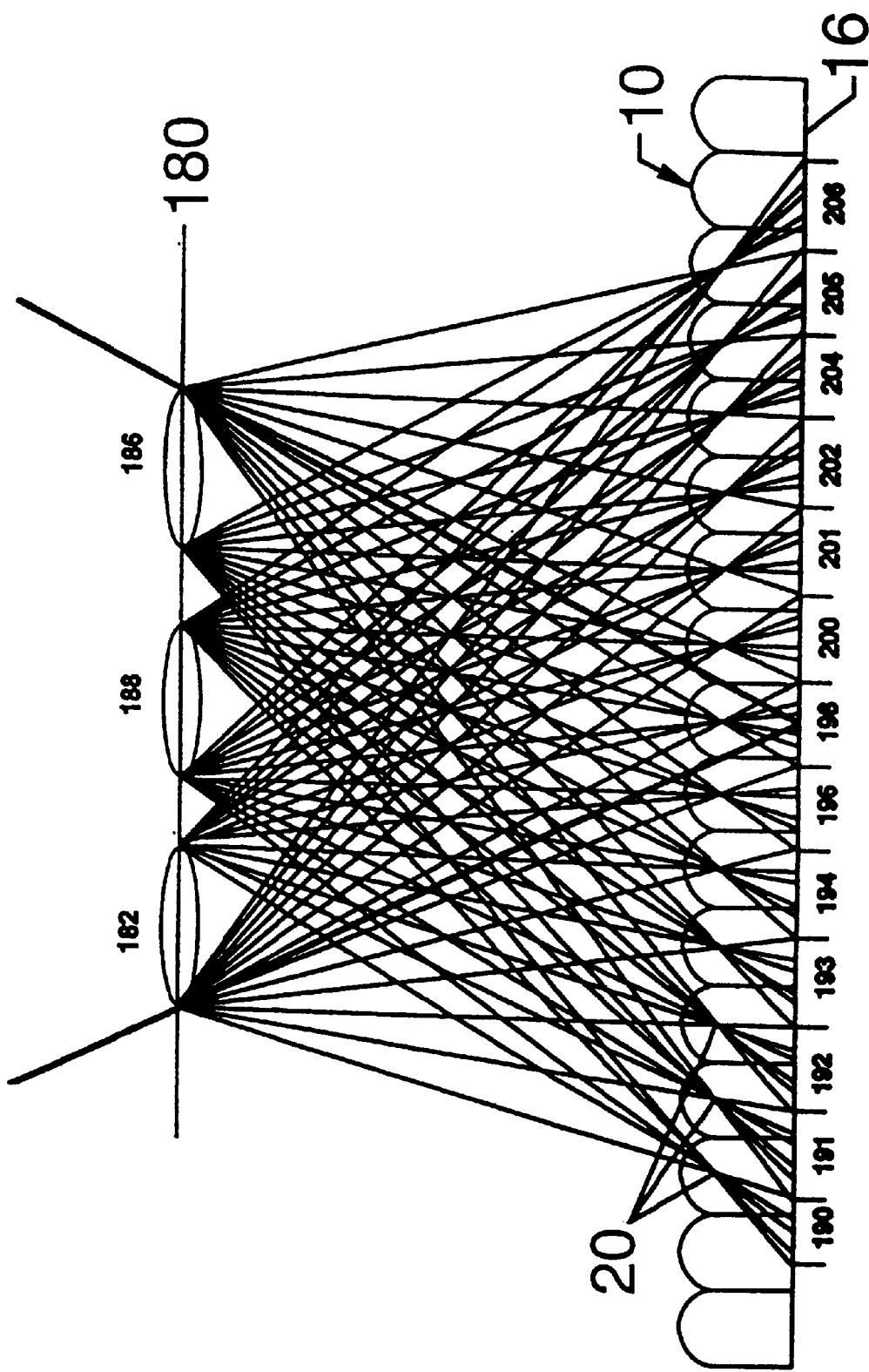
FIG. 9 illustrates the benefit of the invention, which fills the accepting angle with projecting apertures, so that there are no gaps between zones.

The length of the line segment to be filled with projecting apertures can be determined geometrically for any perpendicular distance from the lenticular screen by projecting the edges of a zone of the lineiform image centered under a lenticula through the optical center of the lenticula and measuring the length of the chord of the accepting angle at that distance. In practice, all that need be ascertained is the length of the chord of the angle which if filled with projecting apertures fills the zone with lines of the lineiform image. For example, FIG. 9 illustrates projecting apertures 182, 188, and 186 linearly arrayed on plane 180 along the chord of the accepting angle of the lenticular screen 10. By filling the line segment equal to the length of the chord of the accepting angle with projecting apertures as described herein, the zones of the lineiform image will line up under the lenticular screen without gaps.

Unlike lenticular print systems disclosed in previous patents, however, the zones of the lineiform image will not line up directly under the lenticulas. Instead, each zone will be displaced towards the outer edge of the lenticular screen relative to the lenticula which produced that zone. The amount of displacement increases as the distance from the center of projection (i.e., the bisector of the accepting angle) increases. It is this ever increasing displacement, however, that ensures that the viewer will perceive correctly matched lines of the lineiform image. Further, because the accepting angle is based on the entire lenticular screen rather than only one lenticula, one-step composing can be accomplished for any enlarging distance simply by filling a line segment equal to the length of the chord of the accepting angle with projecting apertures.

Figure 11:
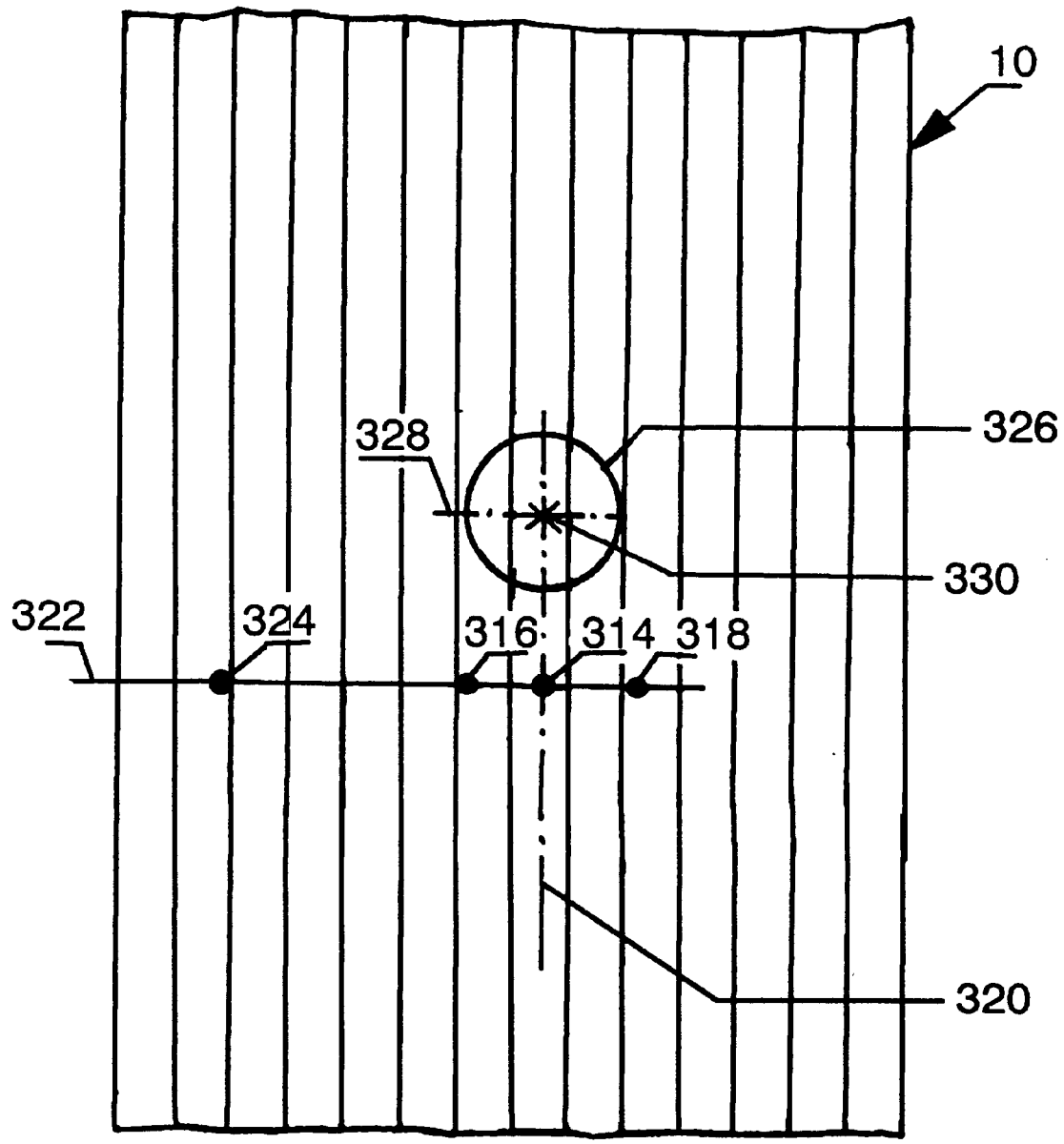
FIG. 11 is a top view of a lenticular screen and illustrates methods in accordance with the invention for measuring the length of the chord of the accepting angle and the central resolution angle.

As shown in FIG. 10, the chord of the accepting angle is the line segment 88 between the point 98, from directly above a lenticula where the projection 90 can be seen, and the point 100 along a path parallel to the lenticular screen 10 and perpendicular to the direction of the lenticulas from which the same projection 90 on focal plane 16 is seen once again. To determine the length of this line segment, a point source of light is projected onto the lenticular screen from the desired enlarging (i.e., viewing) distance. As shown in FIG. 11, a point source of light 330 is projected onto the lenticular screen 10 defining a focal plane in contact with a diffuse reflective surface. For this purpose, the center lens of the enlarger may be used with the aperture stopped down. The photographer locates the spot 314 on the plane of the projecting apertures where the lenticular screen appears brightest when observed near the axis 320 of the projecting aperture 326 which is parallel to the direction of the lenticulas. The photographer then moves parallel to the lenticular screen along a line 322 perpendicular to the direction of the lenticulas towards spot 316 so that the lenticular screen appears darker, and continues along line 322 in the same direction until the screen appears brightest once again at spot 324. The distance between the center of the first brightest spot 314 and the center of the second brightest spot 324 is then measured.

In FIG. 10, the center of the first brightest spot 314 corresponds to point 98 and the center of the second brightest spot 324 corresponds to point 100. The measured distance between spot 314 and spot 324 is the length of the chord of the accepting angle. By filling line segment 88 in FIG. 10 (which corresponds in length to the measured distance between spot 314 and spot 324) with projecting apertures, the zones of the lineiform image will line up under the lenticular screen 10 without gaps, as illustrated by zones 190 through 206 in FIG. 9. As previously mentioned, the chord defined by the accepting angle at the desired enlarging distance is also defined by the angle equal to the aperture angle of the lenticular screen 10 with its vertex positioned on the focal plane 16 of the lenticular screen.

3. The number of projecting apertures to be used.

At least two problems can arise based on the number of discrete two dimensional images created by the camera and the number of projecting apertures used by the enlarger to project the discrete two dimensional images onto the lenticular screen. First, the three dimensional image can suffer from stroboscopic effect (i.e., the viewer perceives two separate images simultaneously, or perceives a distinct switch from an image produced by one lens to an image produced by another lens as the viewer moves his head). Second, gaps can appear between the lines of the lineiform image if an insufficient number of projecting apertures is used. Gaps between lines of the lineiform image produce a perceived loss of the three dimensional image, thus deteriorating its quality.

In general, known enlarging systems have used an arbitrary number of projecting apertures ranging anywhere from two to ten. The use of an arbitrary number of projecting apertures typically creates unstable images because the number of projecting apertures should be selected based on the capabilities of the enlarging system and the resolution capability of the human eye. As is known, the perceived depth of an element of an image depends on the parallax of the element. As the parallax of the element increases, the perceived depth of the element increases. However, if the parallax of an element projected onto the lenticular screen is too large, the brain will not be able to transform the lineiform image into a coherent three dimensional picture.

Figure 12:
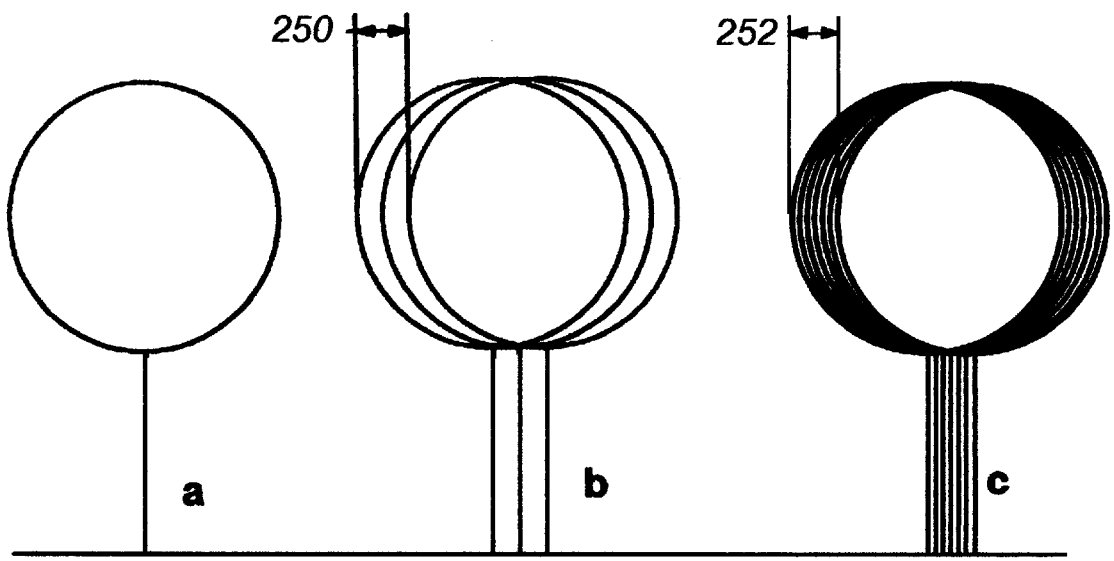
FIG. 12 illustrates the amalgamation of a plurality of discrete two dimensional images of an element (a) in objective space as disclosed by the prior art (b), and as taught by the method and apparatus of the invention (c)

FIG. 12 shows a discrete two dimensional image of an element in objective space having an upper portion consisting of a circle and a lower portion consisting of a straight line (a). The discrete two dimensional image is taken from a single vantage point for use in a row of discrete images to be projected onto a lenticular screen. FIG. 12 further shows the conceptual result when discrete two dimensional images of the same element are taken from three different vantage points (b). The total parallax of the element in (b) is shown by 250. In general, the human brain perceives only a portion of the total parallax at one time. The brain amalgamates the discrete two dimensional images under the lenticular screen to produce a coherent three dimensional image. When the viewer's head shifts, the brain looks for the next portion of the total parallax that it can perceive and amalgamates that portion. However, in the case of the element shown in (b), the parallax between each pair of the discrete images is so large that the viewer perceives a distinct switch in the amalgamated image when moving from the left-most pair of images to the right-most pair of images because of the large space between the pairs of images.

FIG. 12 further shows the conceptual result when discrete two dimensional images of the same element are created from a preferred number of projecting apertures (c), as described herein. The total parallax, shown by 252, is the same as the total parallax 250 in (b). In (c), however, the additional number of discrete two dimensional images produces an effect wherein the parallax between adjacent images is minimized, thus permitting the brain to repeatedly amalgamate the images to produce a coherent three dimensional image. Because the brain is presented with a continuum of images, stroboscopic effect is eliminated.

To eliminate stroboscopic effect, the number of discrete two dimensional images created by the camera should be greater than the number of lines defining the outer edges of an element in objective space having similar sharpness and contrast that the human eye can resolve over a distance equal to the largest single parallax from the desired minimum viewing distance of the resulting photograph. The term "largest single parallax" refers to the distance on the lenticular screen between the two images of the same element projected by the outermost lenses of the enlarger which is the largest of the distances between the two images of those elements which the photographer wishes to be free from stroboscopic effect.

For example, if a photographer takes a photograph, to be viewed at a minimum distance of 50 cm, having three elements to be free from stroboscopic effect having total parallax of 1.7 cm, 2.0 cm, and 2.5 cm, respectively; the number of projecting apertures should be greater than the number of lines that the human eye can resolve over 2.5 cm (the largest single parallax) from a distance of 50 cm. The images of those elements in objective space having a parallax of 2.5 cm or less will flow together without stroboscopic effect when viewed at or beyond the minimum viewing distance. To ensure that the entire photograph is free from stroboscopic effect, the photographer must compare the total parallax for each element in objective space that the photographer desires to be free from stroboscopic effect, including any background and foreground elements.

To ensure that there are no gaps between the lines of the lineiform image, the number of discrete two dimensional images created by the camera and the number of discrete two dimensional images projected by the enlarger must be greater than the number of lines that can be resolved by a lenticula in the direction of parallax within the width on the focal plane to be filled with lines, typically one zone of the lineiform image, where the width of the zone is defined by the distance between the plane of the projecting apertures and the plane of the optical centers of the lenticular screen. The number of lines that can be resolved by the lenticula should take into account the resolution capabilities of the lenticular print system as will be perceived by the viewer, in other words, not just the recording capability, but also the transmitting capability of the lenticular print system.

The number of lines a lenticula is capable of resolving (including both recording and transmitting) can be determined by projecting a point source of light onto the lenticular screen (which defines a focal plane in contact with a diffuse reflective surface) from the plane of the projecting apertures. For this purpose, the center lens of the enlarger may be used with the aperture stopped down. Similar to the method of determining the length of the chord of the accepting angle previously described, the photographer locates a first spot 314 (FIG. 11) on the plane of the projecting apertures where the lenticular screen is the brightest when observed near the axis 320 of the projecting aperture 326 which is parallel to the direction of the lenticulas. The photographer then moves parallel to the screen along the line 322 perpendicular to the direction of the lenticulas so that the lenticular screen appears darker, to a second spot 316 where the brightness of the light reflected by the lenticular screen has diminished to a preselected minimum acceptable level of brightness.

The minimum acceptable level of brightness is selected by the photographer on the basis of many factors, including the quality of the three dimensional image. Preferably, the minimum acceptable level of brightness is the point beyond which the recording medium to be used can no longer record a perceivable image at normal exposure. The photographer then moves from the second spot 316 along the same line 322 in the direction of the first spot 314 so that the lenticular screen again appears darker, to a third spot 318 where the brightness of the light reflected by the lenticular screen is at the preselected level of brightness once again. The distance between the center of the second spot 316 and the center of the third spot 318 is then measured. The measured distance is the length of the chord of the central resolution angle.

Figure 13:
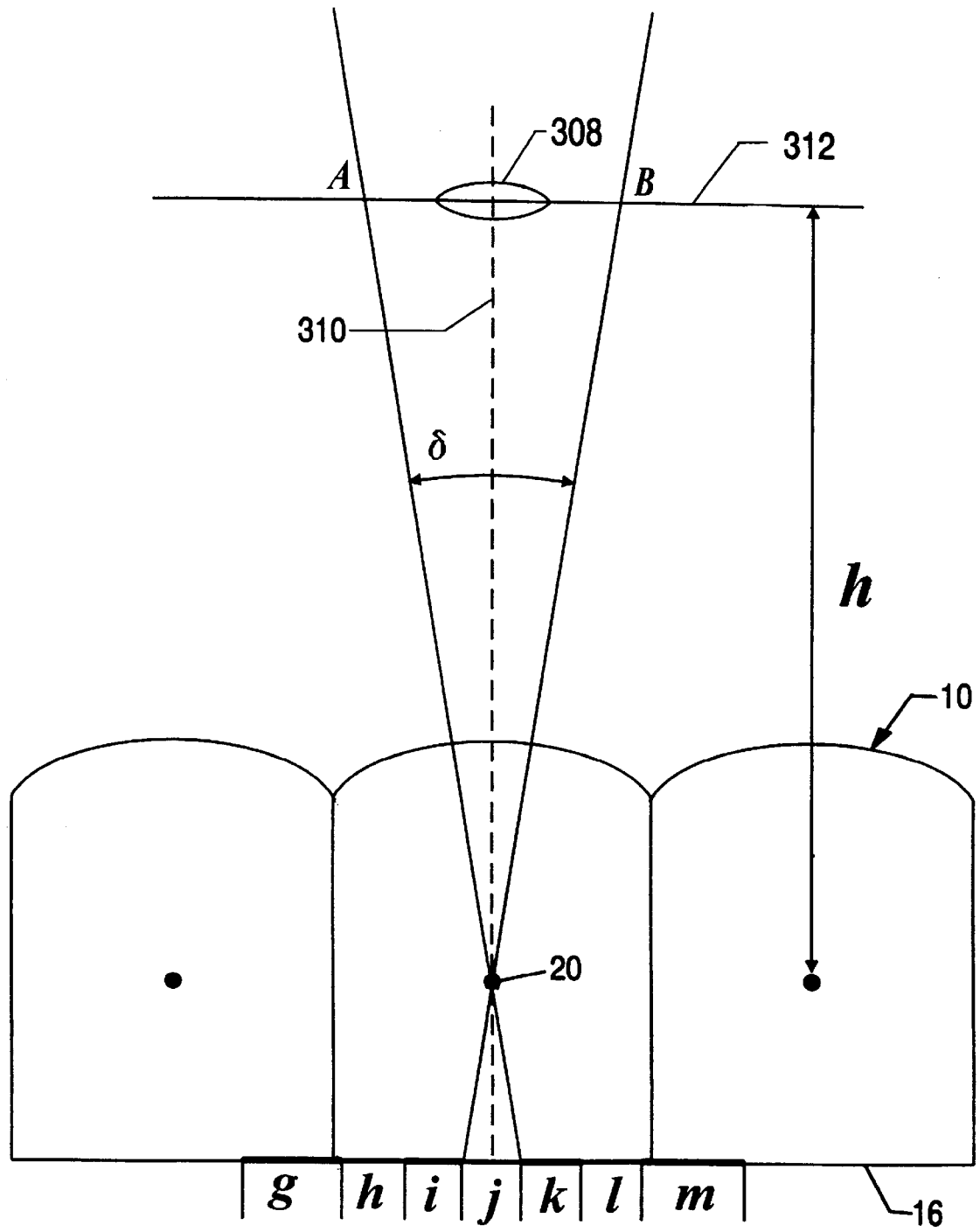
FIG. 13 is a graphic depiction of the central resolution angle.

The central resolution angle is defined by the optical projection of an image which produces the narrowest resolution line. As shown in FIG. 13, the central resolution line j under the center lenticula is narrower than the resolution lines g, h, i, k, l and m produced by subsequent projecting apertures. The length of the chord of the accepting angle, as described above, is divided by the length of the chord of the central resolution angle, as described above, to determine the minimum number of lines to be recorded within one zone so that the lines of the lineiform image overlap. As is apparent, the resolution angle increases as the pitch about the optical center of the lenticula is increased. Thus, it is only necessary to determine the resolution angle directly above the optical center of the lenticula, referred to herein as the central resolution angle.

An alternative method for determining the number of lines of the lineiform image that a lenticula is capable of resolving within one zone is to expose the negative photosensitive material of the lenticular screen to a source of light and then develop the negative photosensitive material. In the alternative method, the photographer performs the same steps in a well-lit room, but instead of looking first for the brightest spot, the photographer looks first for the darkest spot. The advantage of this alternative method is that the resolution of the photosensitive material is thereby accounted for. In either of the methods, the distance between the brightest (or darkest) first spot 314 and the second spot 316 at the preselected minimum acceptable level of brightness (darkness) can be measured and the result doubled to provide an approximate measure of the length of the chord of the central resolution angle. The method may also be accomplished by exposing and developing a positive photosensitive material and performing the original steps.

4. The size and spacing of the projecting apertures.

A lenticular screen records only the image information that is passed through the projecting aperture of a lens of the enlarger. Therefore, the width of the projecting apertures should be selected to conform to the operational parameters of the lenticular print system. As discussed below, the width of a projecting aperture refers to its width measured in the direction of the row of lenses of the enlarger. To form a lineiform image of superior quality, the lines of the lineiform image must be of uniform width. Factors which affect the width of a line are: 1) the width of the projecting apertures and the distance between the lenticular screen and the plane of the projecting apertures; 2) the intensity of the projected image; and 3) aberrations in the lenticular screen.

The width of a line is determined theoretically by the width of the projecting aperture and the distance between the lenticular screen and the plane of the projecting apertures. This theoretical model, however, is distorted due to the characteristics of the lenticular print system. First, the width of each line is a function of the intensity of the projected image; the brighter the projected image, the wider the line. Additionally, distortions caused by aberrations in the lenticular screen limit the width of a line that can be resolved by the lenticular print system. In theory, any increase in the resolution of the lenticular print system would therefore require a greater number of lenses.

Figure 14:
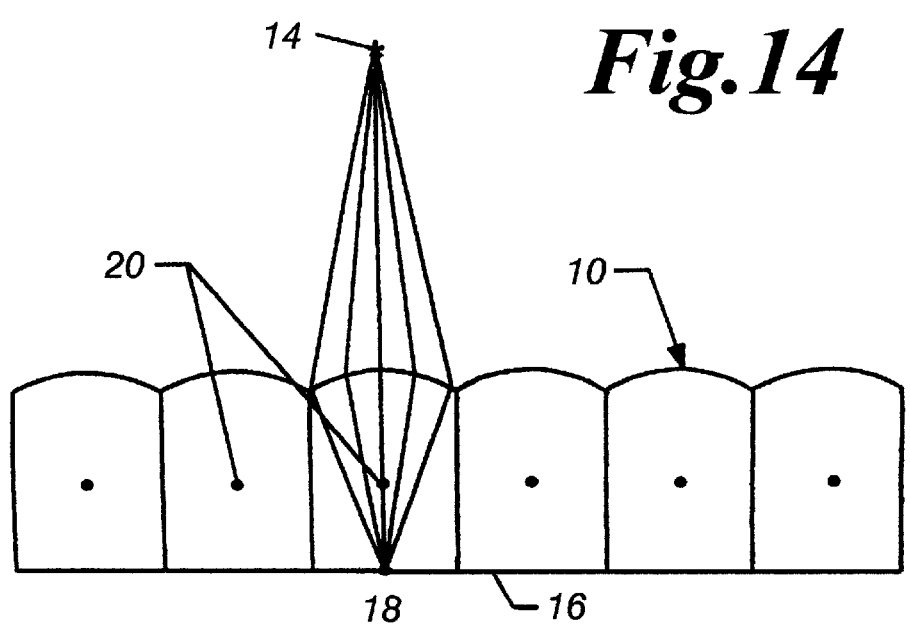
FIG. 14 depicts a model of an ideal lenticular lens.

FIG. 14 illustrates the path of light through an optically perfect lenticula. Light projected from a point source of light 14 onto the surface of the lenticular screen 10 converges at discrete point 18 on focal plane 16. The optical center 20 is the point through which any ray of light passing through the lenticula experiences no net deviation. The ideal lenticula is constructed such that any ray of light radiated from source 14 converges on the focal plane 16 of the lenticular screen 10 at the point where the ray passing through the optical center 20 intersects the focal plane. Known methods and apparatus for producing three dimensional images assume that the lenticulas of the lenticular screen are ideal, and thus capable of creating exact lineiform images. In practice, however, aberrations in the surfaces of the lenticulas can, and inevitably do, create distortions in the path of light through the lenticula.

Figure 15:
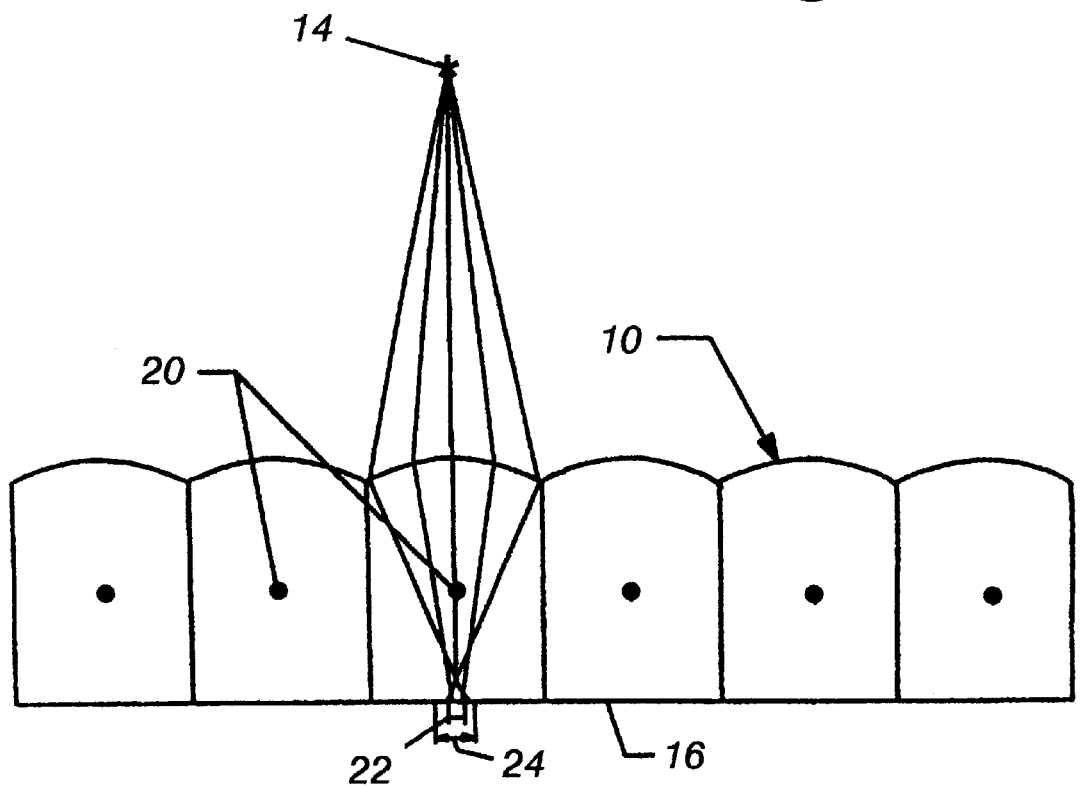
FIG. 15 depicts a model of a conventionally manufactured lenticular lens, showing the effect of aberrations in the lenticular print system on the path of light through a lenticula.

FIG. 15 shows the path of light through a typical lenticula of a lenticular screen 10 having aberrations. Light from point source of light 14 projected onto the surface of the lenticular screen 10 produces an image on the focal plane 16 under the optical center 20. The image produced is distorted due to the aberrations in the surface of the lenticula, and thus is spread across the width 22. Additional distortion is seen when the image is viewed through the lenticular screen 10 due to the resolving power of the lenticula and the resolving power of the photosensitive material. The additional distortion causes the image to be spread across the larger width 24. The magnitude of these cumulative distortions is related to the angle of incidence of the radiated light. Further, these distortions are proportional to the focal length of the lenticular screen 10. Thus, the total amount of distortion due to imperfections in the lenticular print system is fixed for a known enlarger and lenticular screen.

Accordingly, there is an inherent lower limit that the width of an image projected on the focal plane of the lenticular screen can occupy. The narrowest line of the lineiform image that can be resolved by the lenticula from a projecting point, as seen by the viewer, is termed a resolution line. If a projecting aperture projects an image on the focal plane that is narrower than the resolution line of the lenticula, the aberrations of the lenticular print system will expand the width of the image to the width of the resolution line.

Figure 16:
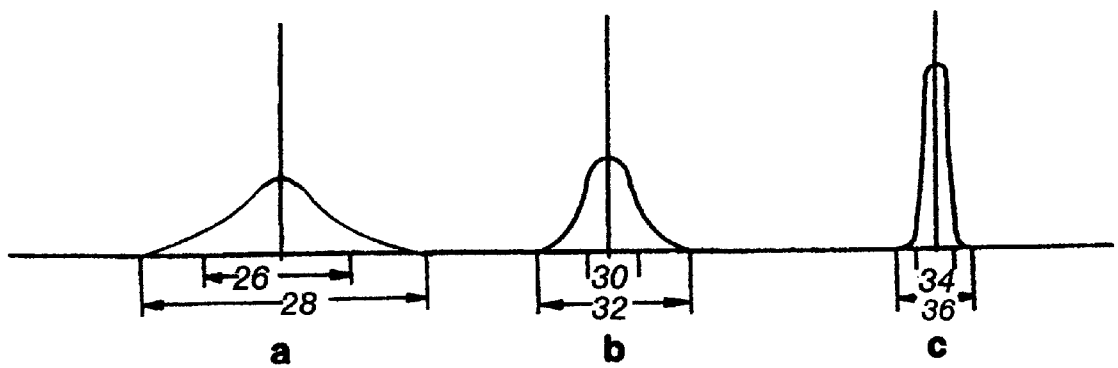
FIG. 16 depicts a series of graphs (a), (b) and (c) of brightness verses the width of a single line of a lineiform image.

Another source of distortion is related to the intensity of the light projected onto the lenticular screen. FIG. 16 is a graphic depiction of the intensity of a single line of the lineiform image on the focal plane of the lenticular screen. The height and width of the graph of the line in (a) is determined by the intensity of the light projected onto the screen. The total width of the line is indicated by 28. The intensity, and thus, the effectiveness of the light diminishes exponentially outwardly from the center. Thus, the photographer must decide where along the slope of the graph the intensity of the light is insufficient. In general, the viewer's eye will perceive only the most intense area, indicated by 26, when viewing the image projected onto the lenticular screen. A line of the lineiform image exposed to a lesser intensity of light is depicted in (b). Both the actual width of the line, indicated by 32, and the effective width of the line, indicated by 30, are narrower than the line depicted in (a).

Figure 17:
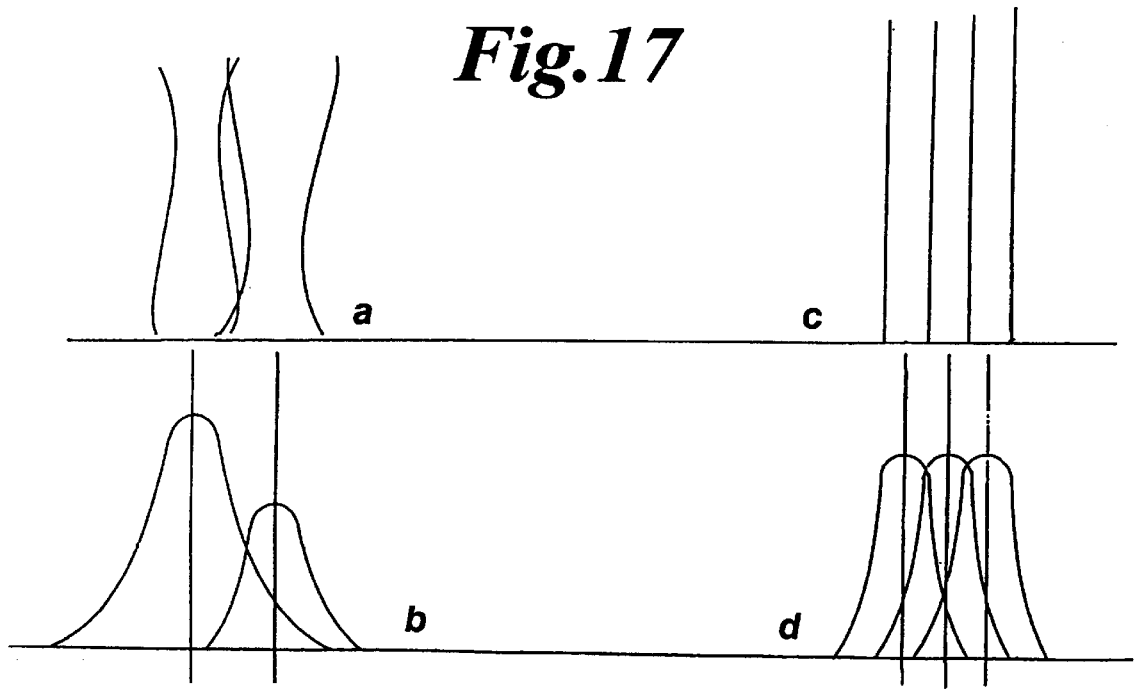
FIG. 17 is a graphic depiction comparing the matching of lines of the lineiform image as they actually exist (a) and (b) and as they are described by the prior art (c) and (d)

Because the effective width of a line depends on the intensity of the image projected, the width of a line varies over its length in accordance with the intensity of the image being recorded. In FIG. 17, (b) shows two adjacent lines of the lineiform image exposed at different intensities. Also in FIG. 17, (a) is a top view of the same two lines as they would appear in a three dimensional image where the intensity of the image varies over its length. The lines are of uneven width and thus create gaps and overlaps in the lineiform image. To ensure that the lines of the lineiform image will be of uniform width, either the intensity of the image must be held constant over the length of the image, or the images must be projected within the physical limits of the lenticular print system.

The method of the invention relates the width of the lines of the lineiform image to the resolution limits of the lenticular print system. If a line of the lineiform image is limited to the width of the resolution line of a lenticula, each line produced will have substantially the same width as its corresponding resolution line. In FIG. 16, (c) is a graphic depiction of a resolution line having a preselected density and contrast produced by a point source of light, such as by stopping down the center lens of the enlarger. The lenticular print system is incapable of recording a line of the lineiform image smaller than this resolution line. In FIG. 17, (c) and (d) show a resulting lineiform image composed of "resolution lines." Because the slope of the resolution line is so steep, the photographer must determine the "effective" width of the resolution line precisely in order to achieve a proper matching of the line on the lineiform image.

Only the central resolution line need be measured to determine the maximum size of the projecting apertures for the lenticular print system. As previously discussed, because aberrations in the surface of the lenticular screen increase as the angle of pitch increases, the resolution line increases in width from the center to the outer edges of the lenticula. Therefore, to ensure that each projecting aperture produces a line of the lineiform image that is equal in width to its corresponding resolution line, it is sufficient to ensure that the distances between the secondary axes of the projecting apertures, i.e., the axes in the plane of the projecting apertures and parallel to the direction of the lenticulas, equal the length of the chord of the central resolution angle.

FIG. 13 illustrates the importance of the discovery of the central resolution angle delta ($\delta$). For the lenticular screen 10 having a focal plane 16, each lenticula has an optical center 20 and the line segments indicated by g, h, i, j, k, l and m on the focal plane 16 correspond to the lines of the lineiform image resolved by the lenticula in response to a light source. The widths of the line segments g, h, i, j, k, l, and m represent the resolving power, i.e., the widths of the resolution lines of the lenticula having optical center 20. As is known, the narrowest line is located on the focal plane directly under the main optical axis of the center lenticula. Therefore, the width of the central resolution line j in FIG. 13 is the narrowest.

The central resolution angle δ is the resolution angle of the resolution line located directly under the optical center 20 of the lenticula. As previously described, the central resolution angle is created by geometrically projecting the ends of line segment AB through the optical center 20. By locating a projecting aperture 308 at a distance h from the plane of the optical centers of the lenticulas completely inside angle δ, and with the main optical axis of the projecting aperture coincident with the main optical axis 310 of the lenticula, the width of the line produced on focal plane 16 will never be narrower than line segment j because it is the central resolution line.

If line 312 in the plane of the projecting aperture 308 is parallel to the focal plane 16 and perpendicular to the direction of the lenticulas, the points A and B of intersection of line 312 with the sides of angle δ result for the distance h. If a point source of light is radiated onto lenticular screen 10 through angle δ from the distance h while the photographer observes the screen, spot 314 (FIG. 11) will coincide with main optical axis 310 (FIG. 13) in the cross sectional view only. Illuminated line j will be projected backward to the photographer by the lenticular screen and the photographer will see a bright image at spot 314. With the photographer's eye located at spot 316 (FIG. 11) near point A (FIG. 13), but outside of resolution angle δ, the photographer will see a greatly diminished brightness reflected by the lenticular screen. As previously described, the length of the chord of the central resolution angle is visually determined based on this effect. The width of the central resolution line under the center lenticula (j in FIG. 13) is equal to Lf/h; where h is the distance from the plane of the projecting apertures to the plane of the optical centers of the lenticular screen; L is the length of the chord of the central resolution angle at the distance h (line segment AB in FIG. 13); and f is the focal length of the lenticular screen.

The projecting apertures selected for the enlarger and the distances between the centers of the apertures should be no wider than the length of the chord of the central resolution angle defined by the distance of the plane of the projecting apertures from the plane of the optical centers of the lenticular screen. A projecting aperture having a width which fits within the central resolution angle at this distance satisfies the above condition. In the method of the invention, the central resolution angle is the angle defined by the chord which when projected through the optical center of the lenticula from the plane of the projecting apertures produces a line on the focal plane of the lenticular screen having a width equal to the width of the central resolution line. The length of this chord can be derived for any distance h between the plane of the projecting apertures and the plane of the optical centers of the lenticulas once the width of the central resolution line j is known by using the formula jh/f.

Figure 18:
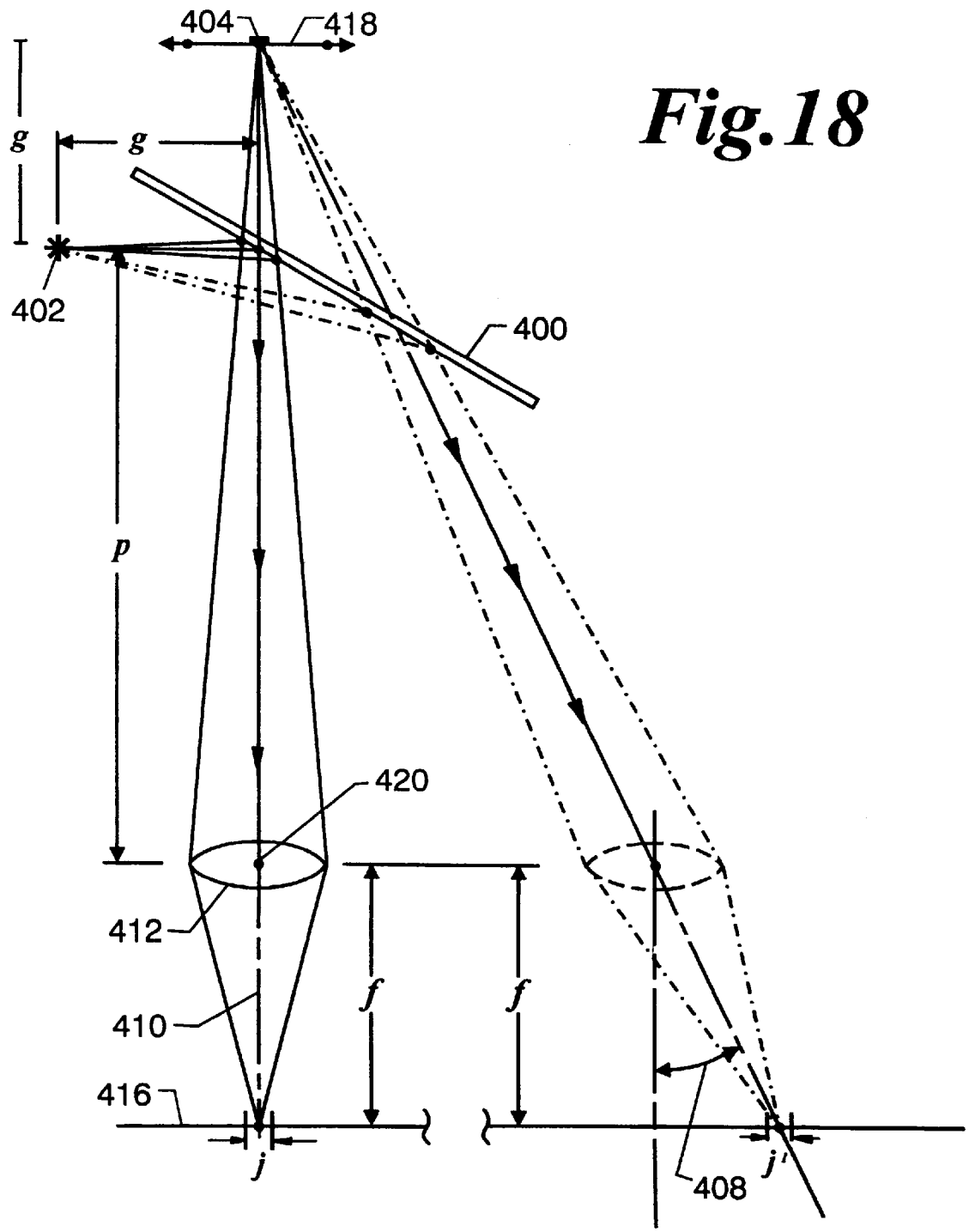
FIG. 18 illustrates a method in accordance with the invention for determining the resolution characteristics of a retro-reflective lens system.

As illustrated in FIG. 18, the central resolution angle can also be utilized to measure the resolution characteristics of a retro-reflective lens system. This alternative use of the method for determining the resolution capability of a lens or a lens system has particular application to automated manufacturing and quality control. A test lens 412 is positioned at a distance f equal to the focal length of the lens above a diffusing screen 416. A two-way mirror 400 is positioned with its reflecting surface at a distance p above the lens 412 and along the main optical axis 410 of the lens. A point source of light 402 is located in a plane parallel to the diffusing screen 416 at the perpendicular distance p from the optical center 420 of the test lens 412. A sensor 404 having a viewing direction coincident with the emitting direction of point light source 402 on test lens 412 is movable laterally on a plane 418 which is parallel to the diffusing screen 416 and perpendicular to the main optical axis 410 of the lens.

With the sensor positioned at a distance g above the reflecting surface of the two-way mirror 400, the width of resolution line j on the diffusing screen 416 can be determined according to the method described above. If it is desired to measure the width of the resolution line $j^1$ in another area of the diffusing screen 416, as indicated by the phantom lines in FIG. 18, the test lens 412 can be moved laterally as shown. The angle 408 is the angle of incidence of the light emitted from the point source of light 402. Because the resolution angle is a function of the resolution of the lens and the roughness of the diffusing screen, the relative diffusion of a pair of surfaces may be determined in a like manner by comparing the resolution characteristics of the two retro-reflective lens systems using the same test lens 412 with known resolution capability.

It is rare that a linearly arrayed row of projecting apertures can be constructed so that the edges of the projecting apertures are in edge-to-edge relationship, as illustrated by the lens set 40 on plane 52 in FIG. 19. Fortunately, because a lenticula cannot resolve an image on the focal plane 16 smaller than the central resolution line j, the width of each projecting aperture can be less than the length of the chord of the central resolution angle, i.e., less than necessary to completely fill the central resolution angle. Any lens set constructed with the width of each of the projecting apertures narrower than the length of the chord of the central resolution angle, and where the secondary axes of the projecting apertures are equally spaced can be used. Lens set 50 on plane 54 illustrates a set of lenses wherein the distances between the secondary axes, indicated by 48 in (a), are equal. The closest plane that any set of equally sized, equally spaced projecting apertures can occupy is the plane on which the distances between the secondary axes of adjacent projecting apertures are equal to the length of the chord of the central resolution angle.

The plane on which a set of equally sized, equally spaced projecting apertures can be positioned such that the distances between the secondary axes of adjacent projecting apertures is equal to the length of the chord of the central resolution angle is referred to herein as the "Plane of the Distance Limit." The term "distance limit" refers to the distance between the plane of the optical centers 20 of the lenticular screen 10 and the Plane of the Distance Limit. The width of the central resolution line j, the focal length of the lenticular screen f, the distances between the secondary axes of adjacent projecting apertures r (48 in FIG. 19), and the distance limit h between the plane of the optical centers 20 of the lenticular screen 10 and the plane of the projecting apertures, are related by the equation h/f=r/j.

The proof for the existence of the Plane of the Distance Limit is as follows: If there is a segment of straight line parallel to the focal plane of the lenticular screen and perpendicular to the direction of the lenticula, there is between this line segment and the lenticular screen a distance limit from which, or from a greater distance, the central projection of the length of the line segment resolved by the lenticula and the photosensitive material is equal to the width of the central resolution line. The plane parallel to the lenticular screen, on which this line segment is located is called the Plane of the Distance Limit. When printing, a condition exists where the plane of the projecting apertures is at the Plane of the Distance Limit for the distances between the secondary axes of the projecting apertures, or is at a distance greater than the limit distance.

Figure 20:
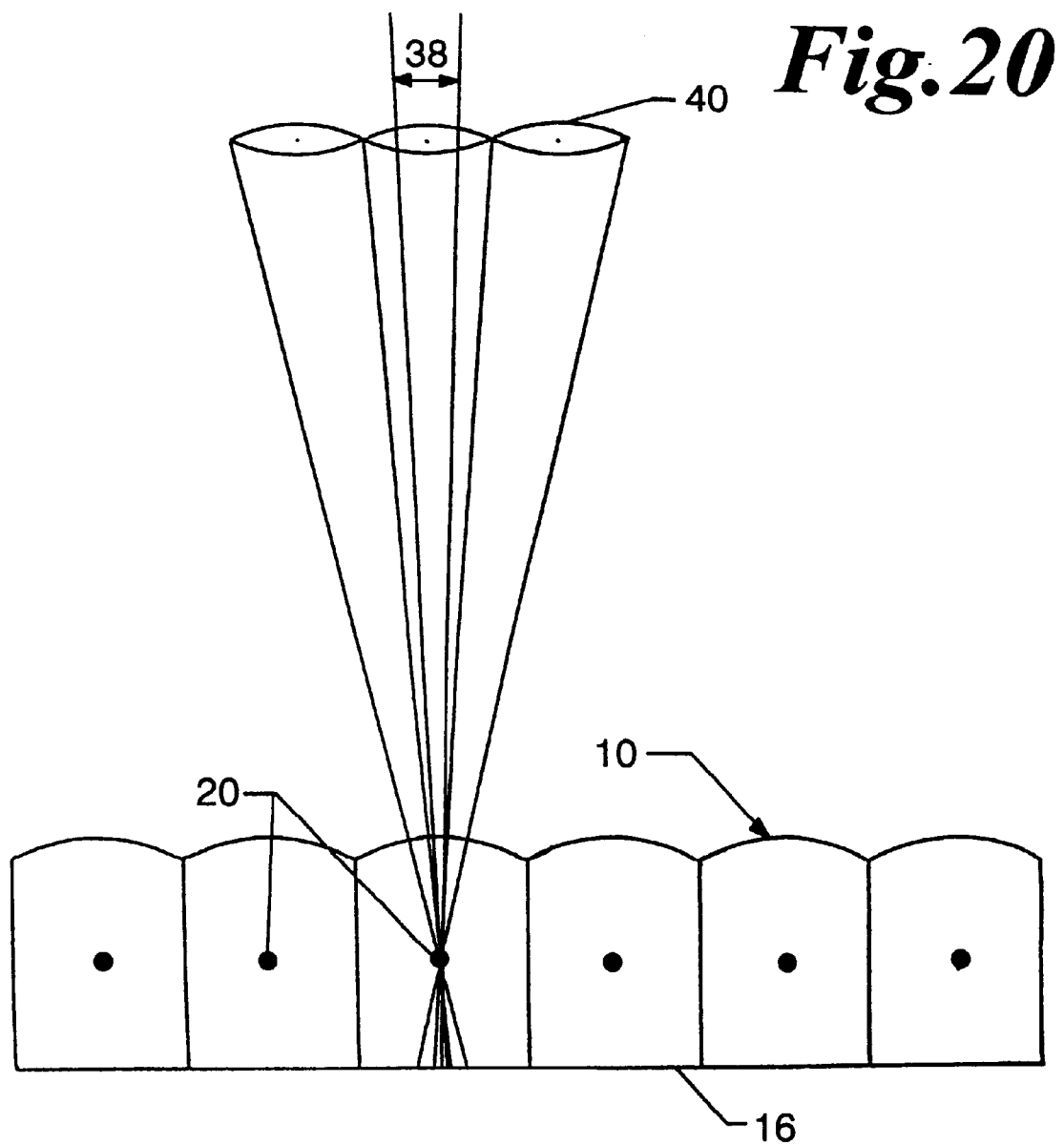
FIG. 20 is a graphic depiction of a row of projecting apertures in edge-to-edge relationship positioned closer to the plane of the optical centers of the lenticular screen than permitted by the central resolution angle in accordance with the invention.

FIG. 20 depicts a lens set 40 in which the projecting apertures are wider than the central resolution angle 38 and, thus, are closer than the distance limit. The lens set 40 is undesirable because the image produced by each projecting aperture on the focal plane is wider than the central resolution line. Thus, the resulting lineiform image will contain lines similar to the lines illustrated in FIG. 17 (a) which are not of uniform width. Further, if the projecting apertures of lens set 40 are stopped down, gaps will form between the lines of the lineiform image produced by the light source.

FIG. 8 illustrates a method for moving the projecting apertures radially in accordance with the method and apparatus of the invention. The projecting apertures should be moved essentially radially along the broken lines 238, 240 and 242 relative to the point 230 on the focal plane 16 of the lenticular screen 10 under the center lenticula. The paths of radial movement should be determined with reference to the radii with their vertices positioned at the point 230. FIG. 8 illustrates a preferred method of moving the projecting apertures essentially radially inside the angle equal to the aperture angle with its vertex at the point 230, while keeping the projecting directions 238, 240 and 242 constant. Moving the projecting apertures according to the method of the invention ensures that the projecting apertures remain within the accepting angles 208, 210, 212, and therefore completely fill the zones of the lineiform image without producing gaps between the lines of the lineiform image.

As previously mentioned, it will be readily recognized by one skilled in the art that the above discussion, although directed to the composing steps, is also relevant to the imaging steps. The photographer selects the lens set for the camera lens with regard to the subject being photographed and the lenticular screen to be used during the composing steps. When determining the arrangement of the lenses, the photographer sets up the camera so that the linearly arrayed row of lenses fills an angle equal to the aperture angle of the lenticular screen with its vertex positioned on the looking plane selected to be the focal plane of the lenticular screen in the final photograph, thus ensuring that the angle of coverage of the camera will match the angle of coverage of the enlarger when printing the three dimensional image.

5. Calibration of both the camera and the enlarger to a standard of arrangements to achieve amalgamation of the two dimensional images on the lenticular screen.

The positions and the focal lengths of the lenses of the camera and of the enlarger, and the positions and magnifications of the discrete two dimensional images recorded on the intermediate medium, e.g., the film, must be arranged so that the images will be perceived as stable and coherent when viewed on the finished lenticular screen photograph. The most serious problem a photographer faces in producing a three dimensional image is amalgamating the two dimensional images onto the lenticular screen quickly and accurately. To achieve quick and accurate amalgamation of the discrete two dimensional images shown in FIG. 21, the camera must create a plurality of images of an element in objective space which are to be amalgamated, for example, to point 120 in accordance with a standard of arrangements to which the enlarger is calibrated.

Of primary importance is the fact that projection of the two dimensional images is based on optical, rather than geometrical, projections of the element on the looking plane to be amalgamated on the lenticular screen. The problem is that manufactured lenses are not perfect. In reality, they include aberrations and imperfections which must be taken into account to produce a superior quality three dimensional image. The "standard row of images" disclosed hereinbelow calibrates the lenses of the camera to the lenses of the enlarger so that the aberrations and imperfections in the lenses are abrogated. The previously known methods and apparatus, on the other hand, do not take into consideration the manufacturing tolerances which produce variances, aberrations and imperfections in the lenses. Instead, they merely calibrate the lenses mechanically so that the lenses are located in the theoretically correct positions, regardless of their actual projections.

Figure 21:
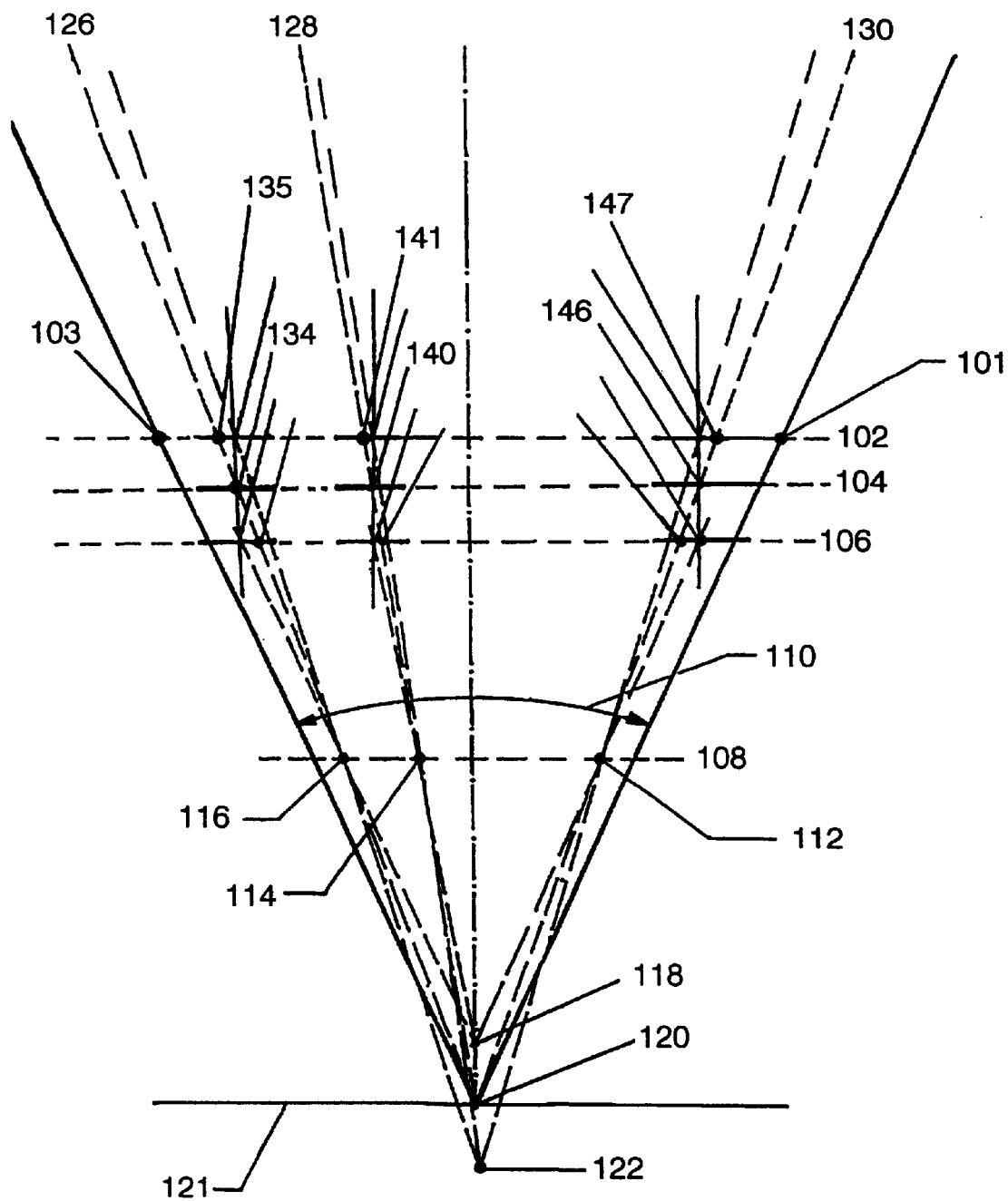
FIG. 21 illustrates a method in accordance with the invention for moving the viewing plane during the composing step.

The term "standard of arrangements" refers to a predetermined relationship between the camera's lenses, the enlarger's lenses and the linearly arrayed row of discrete two dimensional images recorded on the intermediate medium which satisfies the following three conditions: 1) the projecting apertures of the enlarger are placed at a distance from the lenticular screen equal to or greater than the distance limit; 2) as shown in FIG. 21, a set of discrete two dimensional images 135, 141, 147, for example, of an element in objective space to be amalgamated to point 120 on plane 121 are substantially equally spaced, and the distances between the outermost images 135, 147 and the ends 103, 101, respectively, of the chord of the accepting angle are equal to one-half the distance between the adjacent images 135, 141; and 3) the optical centers 112, 114, 116 of the projecting lenses on plane 108 are substantially equally spaced on radial lines 126, 128, 130 connecting the images 135, 141, 147 of the element in objective space to be amalgamated to the point 120.

The above conditions permit the lenses of the camera to cover an angle 110 (FIG. 21) equal to the accepting angle of the lenticular screen, while allowing the optical centers of the projecting lenses to be placed in proper relationship to the two dimensional images, thus obtaining true orthoscopic effect. Further, the images of any element in objective space at the vertex of the angle 110 equal to the aperture angle of the lenticular screen (i.e., where the looking directions of the lenses of the camera converge on the looking plane) will be amalgamated to a single point 120 on the plane of amalgamation 121 of the lenticular screen such that the images are coincident.

Any camera which creates a plurality of two dimensional images of at least one element in objective space so that the images fit within an enlarger constructed in accordance with the foregoing conditions, has a common standard of arrangements with that enlarger. Thus, any shape of lenticula may be used as long as the aperture angle of the lenticular screen is equal to the aperture angle for which the camera and the enlarger were constructed.

A particular row of discrete two dimensional images configured to satisfy the conditions set forth above is termed a "standard row of images." This standard row of images can be used to optically calibrate (as opposed to geometrically calibrate, as disclosed in U.S. Pat. No. 3,953,869 to Wah Lo) cameras and enlargers to the standard of arrangements for that particular standard row of images. Accordingly, all cameras and enlargers calibrated to that particular standard row of images will be interchangeable. In all cases, installation and calibration of the lenses of the camera and the lenses of the enlarger are made in accordance with a standard row of images which is selected by taking into account the foregoing requirements of three dimensional imaging.

To achieve accurate amalgamation of the discrete two dimensional images on the lenticular screen and to avoid deviations in scale on the photograph caused by manufacturing tolerances and aberrations in lenses, at least two reference points positioned at the preselected looking plane must be recorded by the camera on the film; thus creating a standard row of images to be projected by the enlarger. The set of images of each reference point is then made to coincide on the focal plane of the lenticular screen by adjusting the positions and the focuses of the lenses of the enlarger. The same method can be used to calibrate an additional camera to the standard row of images by projecting the standard row onto a screen positioned at a preselected looking plane and adjusting the positions and focuses of the lenses of the camera such that the set of images of each reference point coincides on the preselected looking plane for that camera. Thus, the camera, the enlarger, the row of discrete two dimensional images recorded on the intermediate medium, and their standard of arrangements form an interdependent system.

By manipulation of the relationship between the lenses of the camera and the negatives of the images created by the camera, a wide variety of photographic situations can be handled. For example, if a photographer took a picture in which the camera's row of lenses did not effectively fill the accepting angle, the enlarger could be adjusted to alter the plane of amalgamation. As shown in FIG. 21, moving the negatives 134, 140, 146 linearly on plane 104 adjusts the location of the looking plane of the camera relative to the plane of amalgamation 121 of the lenticular screen. If the negatives are moved inwardly to plane 106, the image will be perceived at location 118. Conversely if the negatives are moved outwardly to plane 102, the image will be perceived at location 122. Those skilled in the art will readily recognize that other manipulations can be similarly performed.

II. Apparatus

Numerous apparatus can be employed to produce the desired results using the methods for producing superior quality three dimensional images described herein. In each case, however, the effective number of lenses of the camera, and thus the number of two dimensional images created by the camera, must be the same as the effective number of lenses of the enlarger.

A camera according to the invention, in its simplest design, includes a row of lenses having main optical axes that are parallel, calibrated to a standard row of images in accordance with the standard of arrangements, and set into a linear plank. The focuses and the spacings between the lenses are fixed. Coupled with a shutter and aperture mechanism, each lens will create a discrete two dimensional image on the film separated by partitions within the camera. In this configuration, the camera is designed to be used at a fixed distance from a preselected looking plane chosen by the photographer to obtain a desired result. The camera can be modified so that the plank of lenses is interchangeable, permitting the photographer to replace a row of lenses having a given focal length with another row of lenses having a different focal length. Each interchangeable plank of lenses, however, must be calibrated in accordance with the standard row of images herein described. The camera may also include a plank of lenses having variable focal lengths to proportionally change the scale of the two dimensional images.

Like the camera, the enlarger may have several configurations. First, the enlarger may include a stationary plank of lenses having main optical axes that are parallel for composing using a fixed distance between the film and the photosensitive material on the lenticular screen. Second, an enlarger may be constructed which includes interchangeable rows of lenses having main optical axes that are parallel. As before, the distance between the film and the photosensitive material on the lenticular screen must remain constant.

Third, an enlarger may be constructed which includes means for permitting each lens of the enlarger to be moved essentially radially relative to a preselected point on the focal plane of the lenticular screen, while the film moves essentially towards or away from the lenticular screen and in a plane parallel to the plane of the projecting apertures. Such an enlarger permits the looking plane to be positioned on the focal plane of the lenticular screen.

Fourth, an enlarger may be constructed which includes means for permitting each lens of the enlarger to be moved essentially radially relative to a preselected point on the focal plane of the lenticular screen, while the row of two dimensional images on the film moves essentially radially. In order to accommodate such movement it may become necessary to cut or bend the film. This system allows for corrections in scale and for the use of different cameras having variably spaced lenses.

Fifth, an enlarger may be constructed which includes means for permitting the film to be moved essentially towards or away from the lenticular screen and in a plane parallel to the plane of the projecting apertures. The enlarger further including means for permitting each lens to be moved essentially radially relative to a preselected point on the focal plane of the lenticular screen. The row of lenses could also be constructed to be interchangeable, permitting for the radial movement of lenses having a given focal length to be exchanged for another row of radially movable lenses having a different focal length. In each case, the enlarger, like the camera, may include lenses having variable focal lengths to proportionally change the scale of the two dimensional images.

From the foregoing, it is readily apparent that the invention provides a method and apparatus for photographing at least one element in objective space to produce a superior quality three dimensional image of the element. By utilizing the method of the invention, a photographer can produce a superior quality three dimensional image having orthoscopic effect, without stroboscopic effect, more quickly and more economically than previously has been possible.

It is to be understood that the foregoing description and the specific embodiments disclosed herein are merely illustrative of the best mode of the invention and the principles thereof, and that various modifications and additions may be made to the method and apparatus of the invention by those skilled in the art, without departing from the spirit and scope of the invention. In particular, it should be noted that the term "substantially" as used herein indicates that the manufacturing tolerances, variances, aberrations and imperfections inherent in the lenticular print system must be taken into account when considering the effect of limitations such as "linearly arrayed," "equally sized" and "equally spaced."

That which is claimed is:

1. In a stereoscopic imaging system utilizing a lenticular screen comprising a plurality of longitudinal lenticulas situated above a focal plane in contact with a diffuse reflecting surface and defining a plane of optical centers parallel to the focal plane, the lenticular screen having a predetermined accepting angle, the accepting angle defining a chord of the accepting angle on a plane of projecting apertures for any preselected distance from the plane of optical centers to the plane of projecting apertures, a method of determining the length of the chord defined by the accepting angle comprising the steps of:

radiating light from a point source positioned on the plane of projecting apertures onto the lenticular screen;

locating a first spot on the plane of projecting apertures and along a first axis parallel to the direction of the lenticulas from which first spot the light reflected by the lenticular screen appears brightest; and locating a second spot on the plane of projecting apertures and along a second axis perpendicular to the direction of the lenticulas from which second spot the light reflected by the lenticular screen appears brightest once again by moving away from the first spot along the second axis so that the light reflected by the lenticular screen appears darker;

the distance between the center of the first spot and the center of the second spot being the length of the chord defined by the accepting angle on the plane of projecting apertures.

2. In a stereoscopic imaging system utilizing a lenticular screen comprising a plurality of longitudinal lenticulas situated above a focal plane in contact with a negative photosensitive material and defining a plane of optical centers parallel to the focal plane, the lenticular screen having a predetermined accepting angle, the accepting angle defining a chord of the accepting angle on a plane of projecting apertures for any preselected distance from the plane of optical centers to the plane of projecting apertures, a method of determining the length of the chord defined by the accepting angle comprising the steps of:

radiating light from a point source positioned on the plane of projecting apertures onto the lenticular screen to expose the negative photosensitive material;

developing the negative photosensitive material;

locating a first spot on the plane of projecting apertures and along a first axis parallel to the direction of the lenticulas from which first spot the light reflected by the lenticular screen appears darkest; and locating a second spot on the plane of projecting apertures and along a second axis perpendicular to the direction of the lenticulas from which second spot the light reflected by the lenticular screen appears darkest once again by moving away from the first spot along the second axis so that the light reflected by the lenticular screen appears brighter;

the distance between the center of the first spot and the center of the second spot being the length of the chord defined by the accepting angle on the plane of projecting apertures.

3. In a stereoscopic imaging system utilizing a lenticular screen comprising a plurality of longitudinal lenticulas situated above a focal plane in contact with a positive photosensitive material and defining a plane of optical centers parallel to the focal plane, the lenticular screen having a predetermined accepting angle, the accepting angle defining a chord of the accepting angle on a plane of projecting apertures for any preselected distance from the plane of optical centers to the plane of projecting apertures, a method of determining the length of the chord defined by the accepting angle comprising the steps of:

radiating light from a point source positioned on the plane of projecting apertures onto the lenticular screen to expose the positive photosensitive material;

developing the positive photosensitive material;

locating a first spot on the plane of projecting apertures and along a first axis parallel to the direction of the lenticulas from which first spot the light reflected by the lenticular screen appears brightest; and locating a second spot on the plane of projecting apertures and along a second axis perpendicular to the direction of the lenticulas from which second spot the light reflected by the lenticular screen appears brightest once again by moving away from the first spot along the second axis so that the light reflected by the lenticular screen appears darker;

the distance between the center of the first spot and the center of the second spot being the length of the chord defined by the accepting angle on the plane of projecting apertures.

4. In a stereoscopic imaging system utilizing a lenticular screen comprising a plurality of longitudinal lenticulas situated above a focal plane in contact with a diffuse reflecting surface and defining a plane of optical centers parallel to the focal plane, the lenticulas having a predetermined central resolution angle, each central resolution angle defining a chord of the central resolution angle on a plane of projecting apertures for any preselected distance from the plane of optical centers to the plane of projecting apertures, a method of determining the length of the chord defined by each central resolution angle comprising the steps of:

radiating light from a point source positioned on the plane of projecting apertures onto the lenticular screen;

locating a first spot on the plane of projecting apertures and along a first axis parallel to the direction of the lenticulas from which first spot the light reflected by the lenticular screen appears brightest; and locating a second spot on the plane of projecting apertures and along a second axis perpendicular to the direction of the lenticulas from which second spot the light reflected by the lenticular screen is at a preselected brightness by moving away from the first spot along the second axis so that the light reflected by the lenticular screen appears darker;

the distance between the center of the first spot and the center of the second spot being one-half the length of the chord defined by each central resolution angle on the plane of projecting apertures.

5. The method of claim 4 comprising the further step of:

locating a third spot on the plane of projecting apertures and along the second axis from which third spot the light reflected by the lenticular screen is at the preselected brightness once again by moving away from the second spot along the second axis towards the first spot so that the light reflected by the lenticular screen appears brighter;

the distance between the center of the second spot and the center of the third spot being the length of the chord defined by each central resolution angle on the plane of projecting apertures.

6. In a stereoscopic imaging system utilizing a lenticular screen comprising a plurality of longitudinal lenticulas situated above a focal plane in contact with a negative photosensitive material and defining a plane of optical centers parallel to the focal plane, the lenticulas having a predetermined central resolution angle, each central resolution angle defining a chord of the central resolution angle on a plane of projecting apertures for any preselected distance from the plane of optical centers to the plane of projecting apertures, a method of determining the length of the chord defined by each central resolution angle comprising the steps of:

radiating light from a point source positioned on the plane of projecting apertures onto the lenticular screen to expose the negative photosensitive material;

developing the negative photosensitive material;

locating a first spot on the plane of projecting apertures and along a first axis parallel to the direction of the lenticulas from which first spot the light reflected by the lenticular screen appears darkest; and locating a second spot on the plane of projecting apertures and along a second axis perpendicular to the direction of the lenticulas from which second spot the light reflected by the lenticular screen is at a preselected darkness by moving away from the first spot along the second axis so that the light reflected by the lenticular screen appears brighter;

the distance between the center of the first spot and the center of the second spot being one-half the length of the chord defined by each central resolution angle on the plane of projecting apertures.

7. The method of claim 6 comprising the further step of:

locating a third spot on the plane of projecting apertures and along the second axis from which third spot light reflected by the lenticular screen is at the preselected darkness once again by moving away from the second spot along the second axis towards the first spot so that the light reflected by the lenticular screen appears darker;

the distance between the center of the second spot and the center of the third spot being the length of the chord defined by each central resolution angle on the plane of projecting apertures.

8. In a stereoscopic imaging system utilizing a lenticular screen comprising a plurality of longitudinal lenticulas situated above a focal plane in contact with a positive photosensitive material and defining a plane of optical centers parallel to the focal plane, the lenticulas having a predetermined central resolution angle, each central resolution angle defining a chord of the central resolution angle on a plane of projecting apertures for any preselected distance from the plane of optical centers to the plane of projecting apertures, a method of determining the length of the chord defined by each central resolution angle comprising the steps of:

radiating light from a point source positioned on the plane of projecting apertures onto the lenticular screen to expose the positive photosensitive material;

developing the positive photosensitive material;

locating a first spot on the plane of projecting apertures and along a first axis parallel to the direction of the lenticulas from which first spot the light reflected by the lenticular screen appears brightest; and locating a second spot on the plane of projecting apertures and along a second axis perpendicular to the direction of the lenticulas from which second spot the light reflected by the lenticular screen is at a preselected brightness by moving away from the first spot along the second axis so that the light reflected by the lenticular screen appears darker;

the distance between the center of the first spot and the center of the second spot being one-half the length of the chord defined by each central resolution angle on the plane of projecting apertures.

9. The method of claim 8 comprising the further step of:

locating a third spot on the plane of projecting apertures and along the second axis from which third spot light reflected by the lenticular screen is at the preselected brightness once again by moving away from the second spot along the second axis towards the first spot so that the light reflected by the lenticular screen appears brighter;

the distance between the center of the second spot and the center of the third spot being the length of the chord defined by the central resolution angle on the plane of projecting apertures.

10. A system for producing a stereoscopic image from a plurality of discrete two dimensional images of at least one element in objective space, said system comprising:

means for creating the plurality of two dimensional images; and means for printing the stereoscopic image comprising:

a lenticular screen comprising a plurality of longitudinal lenticulas situated above a focal plane and defining a plane of optical centers parallel to the focal plane, said lenticular screen having a predetermined accepting angle, the accepting angle defining a chord of the accepting angle on a plane of projecting apertures for any preselected distance from the plane of optical centers to the plane of projecting apertures; and projecting means in spaced relation to and operatively associated with said lenticular screen for projecting the plurality of two dimensional images onto said lenticular screen, said projecting means comprising a plurality of spaced apart projecting apertures linearly arrayed on the plane of projecting apertures, the number of said projecting apertures and the position of each of said projecting apertures being such that said projecting apertures project the plurality of two dimensional images onto said lenticular screen to construct a lineiform image on the focal plane comprising a plurality of zones without gaps between adjacent zones, each of said plurality of zones comprising a plurality of lines corresponding to the plurality of two dimensional images without gaps between adjacent lines, each of said lines being no wider than the narrowest line that can be resolved by said lenticulas of said lenticular screen.

11. A system according to claim 10 wherein said means for creating further comprises means for recording the plurality of two dimensional images on an intermediate medium in one step and wherein said means for printing constructs the lineiform image on the focal plane in one step without moving said projecting means relative to said lenticular screen and without moving the intermediate medium relative to said lenticular screen.

12. A system according to claim 10 wherein the plurality of two dimensional images is projected within each of said plurality of zones comprising said plurality of lines and wherein the plurality of two dimensional images is greater than the number of lines of the lineiform image that said plurality of lenticulas can resolve on the focal plane within each of said plurality of zones.

13. A system according to claim 10 wherein the plurality of two dimensional images is greater than the number of lines defining the edges of an image having the same sharpness and contrast that the human eye can resolve over a distance equal to the distance on the focal plane of said lenticular screen between the two images of the same element in objective space projected by the outermost of said plurality of projecting apertures which is the largest of the distances between the two images of those elements which the photographer wishes to be free from stroboscopic effect when viewed from a preselected minimum viewing distance.

14. A system according to claim 10 wherein said means for printing further comprises a photosensitive material in contact with said plurality of longitudinal lenticulas of said lenticular screen.

15. A system according to claim 10 wherein said means for printing is a multi-lens enlarger and wherein said plurality of projecting apertures are equally spaced along the length of the chord defined by the accepting angle on the plane of projecting apertures.

16. A system according to claim 15 wherein each of said plurality of lenticulas has a predetermined central resolution angle, each central resolution angle defining a chord of the central resolution angle on the plane of projecting apertures for the preselected distance from the plane of optical centers to the plane of projecting apertures; and wherein the minimum number of said plurality of projecting apertures is determined by dividing the length of the chord defined by the accepting angle on the plane of projecting apertures by the length of the chord defined by the central resolution angle on the plane of projecting apertures.

17. A system according to claim 16 wherein each of said plurality of projecting apertures is no wider than the length of the chord of the central resolution angle on the plane of projecting apertures.

18. A system according to claim 16 wherein each of said plurality of projecting apertures has a main optical axis which is perpendicular to the focal plane of said lenticular screen and a secondary axis on the plane of projecting apertures which is parallel to the direction of the lenticulas; and wherein the distances between the secondary axes of adjacent projecting apertures of said plurality of projecting apertures are no greater than the length of the chord defined by the central resolution angle on the plane of projecting apertures.

19. A system according to claim 18 wherein the distances between the secondary axes of the outermost of said plurality of projecting apertures and the respective ends of the chord defined by the accepting angle on the plane of projecting apertures are equal to one-half the distances between the secondary axes of adjacent projecting apertures of said plurality of projecting apertures.

20. A system according to claim 11 wherein said means for creating the plurality of two dimensional images is a multi-lens camera comprising a plurality of optical lenses, each of said plurality of optical lenses having a main optical axis, the main optical axes of said plurality of optical lenses being parallel, and wherein said intermediate medium is a photosensitive material.

21. A means for printing a stereoscopic image from a plurality of discrete two dimensional images of at least one element in objective space, said means for printing comprising:

a lenticular screen comprising a plurality of longitudinal lenticulas situated above a focal plane and defining a plane of optical centers parallel to the focal plane, said lenticular screen having a predetermined accepting angle, the accepting angle defining a chord of the accepting angle on a plane of projecting apertures for any preselected distance from the plane of optical centers to the plane of projecting apertures; and projecting means in spaced relation to and operatively associated with said lenticular screen for projecting the plurality of two dimensional images onto said lenticular screen;

wherein said projecting means comprises a plurality of projecting apertures, the number and position of said plurality of projecting apertures being such that said projecting means projects the plurality of two dimensional images onto said lenticular screen to construct a lineiform image on the focal plane comprising a plurality of zones without gaps between adjacent zones, each of said plurality of zones comprising a plurality of lines corresponding to the plurality of two dimensional images without gaps between adjacent lines, each of said lines being no wider than the narrowest line that can be resolved by said lenticulas of said lenticular screen.

22. A means for printing according to claim 21 wherein said means for printing is a multi-lens enlarger and wherein said plurality of projecting apertures are equally spaced along the length of the chord defined by the accepting angle on the plane of projecting apertures.

23. A means for printing according to claim 22 wherein each of said plurality of lenticulas has a predetermined central resolution angle, each central resolution angle defining a chord of the central resolution angle on the plane of projecting apertures for any preselected distance from the plane of optical centers to the plane of projecting apertures; and wherein the minimum number of said plurality of projecting apertures is determined by dividing the length of the chord defined by the accepting angle on the plane of projecting apertures by the length of the chord defined by the central resolution angle on the plane of projecting apertures.

24. A means for printing according to claim 23 wherein each of said plurality of projecting apertures is no wider than the length of the chord of the central resolution angle on the plane of projecting apertures.

25. A means for printing according to claim 23 wherein each of said plurality of projecting apertures has a main optical axis which is perpendicular to the focal plane of said lenticular screen and a secondary axis on the plane of projecting apertures which is parallel to the direction of the lenticulas; and wherein the distances between the secondary axes of adjacent projecting apertures of said plurality of projecting apertures are no greater than the length of the chord defined by the central resolution angle on the plane of projecting apertures.

26. A means for printing according to claim 25 wherein the distances between the secondary axes of the outermost of said plurality of projecting apertures and the respective ends of the chord defined by the accepting angle on the plane of projecting apertures are equal to one-half the distances between the secondary axes of adjacent projecting apertures of said plurality of projecting apertures.

27. A system for producing a stereoscopic image comprising:

means for creating a plurality of discrete two dimensional images of at least one element in objective space and for recording the plurality of two dimensional images on an intermediate medium, said means for creating comprising a plurality of linearly arrayed optical lenses having looking directions which converge at a single point on a preselected looking plane;

means for printing the stereoscopic image comprising:

a lenticular screen defining a focal plane; and projecting means in spaced relation to and operatively associated with said lenticular screen for amalgamating the two dimensional images onto the focal plane of said lenticular screen, said projecting means comprising a plurality of linearly arrayed optical lenses having looking directions which converge at a single point on the focal plane of the lenticular screen; and a linearly arrayed standard row of images for calibrating said means for creating to said standard row of images and for calibrating said means for printing to said standard row of images, said standard row of images comprising at least two reference points;

wherein said means for creating is calibrated to said standard row of images by amalgamating said at least two reference points on the looking plane; and wherein said means for printing is calibrated to said standard row of images by amalgamating said at least two reference points on the focal plane of said lenticular screen.

28. A system according to claim 27 wherein said means for creating is a multi-lens camera and wherein said means for printing is a multi-lens enlarger.

29. A system according to claim 27 wherein said intermediate medium is a photosensitive material.

30. A method of calibrating a system for producing a stereoscopic image from a plurality of discrete two dimensional images of at least one element in objective space, said method of calibrating comprising the steps of:

constructing a standard row of images comprising at least two reference points such that when the standard row of images is projected by a multi-lens camera the at least two reference points coincide on the looking plane of the camera; and using a multi-lens enlarger comprising a lenticular screen defining a focal plane, projecting the standard row of images onto a viewing medium and adjusting the lenses of the enlarger such that the at least two reference points coincide on the focal plane of the lenticular screen.

31. A method of calibrating a first linearly arrayed plurality of optical lenses having looking directions which converge at a single point on a first preselected looking plane to a second linearly arrayed plurality of optical lenses having looking directions which converge at a single point on a second preselected looking plane, said method of calibrating comprising the steps of:

using the second linearly arrayed plurality of optical lenses, constructing a standard row of images comprising at least two reference points located on the second preselected looking plane of the second linearly arrayed plurality of optical lenses; and using the first linearly arrayed plurality of optical lenses, projecting the standard row of images onto the first preselected looking plane and adjusting the first linearly arrayed plurality of optical lenses such that the at least two reference points coincide on the first preselected looking plane.

32. The method of claim 31 wherein the first linearly arrayed plurality of optical lenses and the second linearly arrayed plurality of optical lenses are the lenses of a multi-lens camera.

* * * * *

UNITED STATES PATENT AND TRADEMARK OFFICE
CERTIFICATE OF CORRECTION

PATENT NO : 5,946,077
DATED : August 31, 1999
INVENTOR(S): Nemirovskiy

It is certified that error appears in the above-identified patent and that said Letters Patent are hereby corrected as shown below:

On the Title Page:
In the ABSTRACT, Line 5, "he" should be "be".

Column 1, Line 53, "lenticular" should be "lenticula".

Column 2, Line 20, "who" should be deleted.

Column 10, Line 18, "at" should be deleted.

Column 11, Line 10, "GAP" should be "GAF".

Column 21, Line 2, "limit distance" should be "distance limit".

Signed and Sealed this

Third Day of April, 2001

Attest:

NICHOLAS P. GODICI

Attesting Officer

Acting Director of the United States Patent and Trademark Office